United States Patent [19]

Takahashi et al.

[11] Patent Number: 5,205,260
[45] Date of Patent: Apr. 27, 1993

[54] METHOD FOR DETECTING CYLINDER AIR AMOUNT INTRODUCED INTO CYLINDER OF INTERNAL COMBUSTION ENGINE WITH EXHAUST GAS RECIRCULATION SYSTEM AND FOR CONTROLLING FUEL INJECTION

[75] Inventors: Shinsuke Takahashi, Yokohama; Teruji Sekozawa, Kawasaki; Makoto Shioya, Tokyo, all of Japan

[73] Assignee: Hitachi, Ltd., Tokyo, Japan

[21] Appl. No.: 865,338

[22] Filed: Apr. 8, 1992

[30] Foreign Application Priority Data

Apr. 10, 1991 [JP] Japan .................. 3-077570

[51] Int. Cl.⁵ .................. F02D 41/18; F02M 25/07
[52] U.S. Cl. .................. 123/494; 123/571; 123/492; 73/118.2
[58] Field of Search .............. 123/478, 480, 486, 492, 123/494, 571; 73/118.2; 364/510

[56] References Cited

U.S. PATENT DOCUMENTS

| | | | |
|---|---|---|---|
| 4,664,090 | 5/1987 | Kabasin | 123/568 X |
| 4,750,464 | 6/1988 | Staerzl | 123/494 |
| 4,807,151 | 2/1989 | Citron | 123/494 X |
| 4,836,174 | 6/1989 | Chujo et al. | 123/571 |
| 4,881,509 | 11/1989 | Ohashi et al. | 123/571 |
| 4,903,657 | 2/1990 | Miyazaki et al. | 123/494 X |
| 4,953,530 | 9/1990 | Manaka et al. | 123/492 X |
| 4,987,877 | 1/1991 | Nakaniwa | 123/494 |
| 4,995,366 | 2/1991 | Manaka et al. | 123/492 |
| 5,002,031 | 3/1991 | Kako | 123/571 X |
| 5,005,552 | 4/1991 | Kawamura | 123/571 |

FOREIGN PATENT DOCUMENTS 0008238 1/1983 Japan .
0208657 8/1988 Japan .
0239352 10/1988 Japan .

Primary Examiner—Willis R. Wolfe
Attorney, Agent, or Firm—Antonelli, Terry, Stout & Kraus

[57] ABSTRACT

A method for controlling an internal combustion engine employing an exhaust gas recirculation system wherein a fuel injection amount is controlled corresponding to a calculated cylinder air mass flow rate and the method comprises the steps of: deriving a flow rate of a recirculated exhaust gas flowing into an induction passage of the engine; predicting a partial pressure of the exhaust gas within the induction passage on the basis of the flow rate of the recirculated exhaust gas; and deriving the cylinder air mass flow rate on the basis of the predicted value of the partial pressure of the recirculated exhaust gas. The method can also be applied to a system employing a parameter representative of fuel transfer characteristics derived by using measured values of parameters including an internal pressure in an induction passage of the engine, and the fuel injection amount is controlled depending upon the parameter representative of the fuel transfer characteristics, with the method comprising the steps of: deriving flow rates of the intake air and the recirculated exhaust gas introduced into the induction passage; predicting a total pressure in the induction passage on the basis of the intake air mass flow rate and the recirculated exhaust gas flow rae flowing in the induction passage; and deriving a parameter representative of fuel transfer characteristics in the induction passage on the basis of predetermined parameters including the total pressure.

20 Claims, 19 Drawing Sheets

METHOD FOR DETECTING CYLINDER AIR AMOUNT INTRODUCED INTO CYLINDER OF INTERNAL COMBUSTION ENGINE WITH EXHAUST GAS RECIRCULATION SYSTEM AND FOR CONTROLLING FUEL INJECTION

BACKGROUND OF THE INVENTION

The present invention relates to a method for controlling an internal combustion engine associated with an exhaust gas recirculation system (hereafter referred to as "EGR" as an exhaust emission control system. More specifically, the invention relates to a method for deriving an accurate value of an intake air mass flow rate (cylinder air mass flow rate) actually introduced into an engine cylinder during active state of the EGR system, which is necessary for engine control, and a method for precisely determining a fuel injection amount with taking delay of transportion of fuel through an intake manifold.

For the purpose of exhaust emission control and fuel economy, modern automotive internal combustion engines employ electronic control systems which maintain air/fuel mixture ratio at a target value throughout the engine operation. In order to control air/fuel ratio with high precision, a cylinder air mass flow rate to be actually introduced into an engine cylinder is precisely detected and necessary fuel flow amount is determined on the basis of the intake air mass flow rate value and the target air/fuel ratio value.

The co-pending U.S. patent application Ser. No. 07/640,598, filed by the same applicant to the present invention on Jan. 10, 1991, pending, and commonly assigned to the assignee of the present invention, discloses a method for determining the intake air mass flow rate to be introduced into the engine cylinder by measuring an intake air mass flow rate flowing into an intake manifold by means of an air flow meter and deriving an internal pressure in the intake manifold on the basis of the measured intake air mass flow rate and further deriving the actually introduced intake air mass flow rate on the basis of the intake air pressure in the intake manifold and an engine speed. In this method, taking the intake air pressure and the engine speed as parameters, the cylinder air mass flow rate corresponding to both parameters is preliminarily measured through experiments. The experimentally measured cylinder air mass flow rate values are mapped in a form of a table. Therefore, the cylinder air mass flow rate is determined by looking up the table in terms of the intake air pressure and the engine speed.

Furthermore, in Japanese Unexamined Patent Publication (Kokai) No. 58-8238, for Japanese Patent Application filed by Toyota Motor Company, Limited on Jul. 6, 1981, discloses a method for determining a fuel injection amount with taking an intake manifold wetting fuel ratio which adhere on the inner periphery of the intake manifold and delivery ratio of the wetting fuel into the engine cylinder, with taking the intake manifold wetting fuel ratio and the wetting fuel delivery ratio as parameters representative of the engine operating condition.

Here, in the recent years, for the purpose of environment protection, emission restriction value for nitrogen oxides ($NO_x$) is set by a strict emission control regulation. In order to satisfy such restriction value, most of the internal combustion engines employs EGR systems. As is well known, the ERG system recirculates part of the exhaust gas exhausted from an exhaust port of the engine into the air intake manifold trough an EGR valve to introduce into the engine cylinder together with the fresh intake air. By effecting recirculation of the exhaust gas through the EGR system, maximum temperature of combustion in a combustion chamber is lowered to reduce generation amount of $NO_x$. On the other hand, the charge efficiency of the intake air into the engine cylinder is variable between active state and inactive state of EGR even when the intake air pressure, the engine speed and the intake air temperature are maintained constant.

Accordingly, when the cylinder air mass flow rate value derived at inactive state of the EGR is applied for derivation of the fuel injection amount in the active state of EGR, the actual air/fuel ratio cannot be controlled to the target air/fuel ratio and can become over rich or over lean.

On the other hand, since mobility of the gas (air and exhaust gas) in the intake manifold is variable depending upon active and inactive states of EGR, a transfer characteristics of the injected fuel into the engine cylinder is variable even at the constant engine operating condition. Accordingly, when the fuel transfer characteristics determined at the inactive state of the EGR is applied for derivation of the fuel injection amount at the active state of EGR, a problem can be encountered to cause an error in air/fuel ratio control.

Despite of the fact as set forth above, since the applicants' co-pending application and the Japanese publication are not directed to derivation of the cylinder air mass flow rate or the fuel injection amount at the active state of EGR, the foregoing problems can be encountered.

SUMMARY OF THE INVENTION

Therefore, it is a first object of the present invention to provide a method for deriving a cylinder air mass flow rate of an internal combustion engine, which can derive the cylinder air mass flow rate with high precision even when an exhaust gas recirculation is effected.

A second object of the invention is to provide a method for controlling fuel injection for the internal combustion engine, in which can compensate fuel transfer delay at high precision even when the exhaust gas recirculation is active.

The above-mentioned first object can be achieved by a system, in an electronic engine control system calculating a cylinder air mass flow rate on the basis of various detected value of the engine operating condition and controlling the fuel supply amount to an engine cylinder based thereon, wherein, when an exhaust gas is recirculated, the cylinder air mass flow rate is derived by estimating a mass flow rate of a recirculated exhaust gas flowing into the cylinder, a partial pressure of the recirculated exhaust gas, or a partial pressure ratio of the intake air and the recirculated exhaust gas in the intake manifold on the basis of an intake air flow rate flowing into intake manifold, and an internal pressure in the intake manifold or detected mass flow rate of a recirculated exhaust gas flowing into the intake manifold, and performing calculation for deriving the cylinder air mass flow rate on the basis of one of the estimated values.

The above-mentioned second object is achieved by a system deriving a parameter representative of a fuel transfer characteristics in an intake manifold on the basis of various detected values of engine operating condition, and controlling fuel supply amount for the engine cylinder based thereon, wherein, when the exhaust gas is recirculated, the fuel transfer character is derived by detecting mass flow rate of the recirculated exhaust gas, estimating total mass flow rate flowing into the engine cylinder, flow rate of the recirculated exhaust gas flowing into the engine cylinder, a partial pressure of the recirculated exhaust gas in the intake manifold or a total pressure in the intake manifold on the basis of at least the detected value of the recirculated exhaust gas flow rate, and by performing calculation to derive the parameter of the fuel transfer characteristics on the basis on at least one of the estimated value.

With the method according to the present invention, since the cylinder air mass flow rate is calculated with taking into account the exhaust gas partial pressure, the recirculated exhaust gas flow rate flowing into the engine cylinder or a partial pressure ratio between the intake air and the recirculated exhaust gas in the intake manifold, as dominant factor for charge efficiency of the intake air into the engine cylinder, the intake air mass flow rate can be calculated with high precision. Also, since the parameter representative of the fuel transfer characteristics is derived with taking into account the total mass flow rate of gas flowing into the engine cylinder, the mass flow rate of the recirculated gas into the engine cylinder, the partial pressure of the exhaust gas in the intake manifold or the total pressure in the intake manifold, which are the dominant factor for the fuel transfer characteristics to deliver the fuel into the engine cylinder, compensation for the fuel transfer delay can be done with high accuracy.

BRIEF DESCRIPTION OF THE INVENTION

Figure 14:
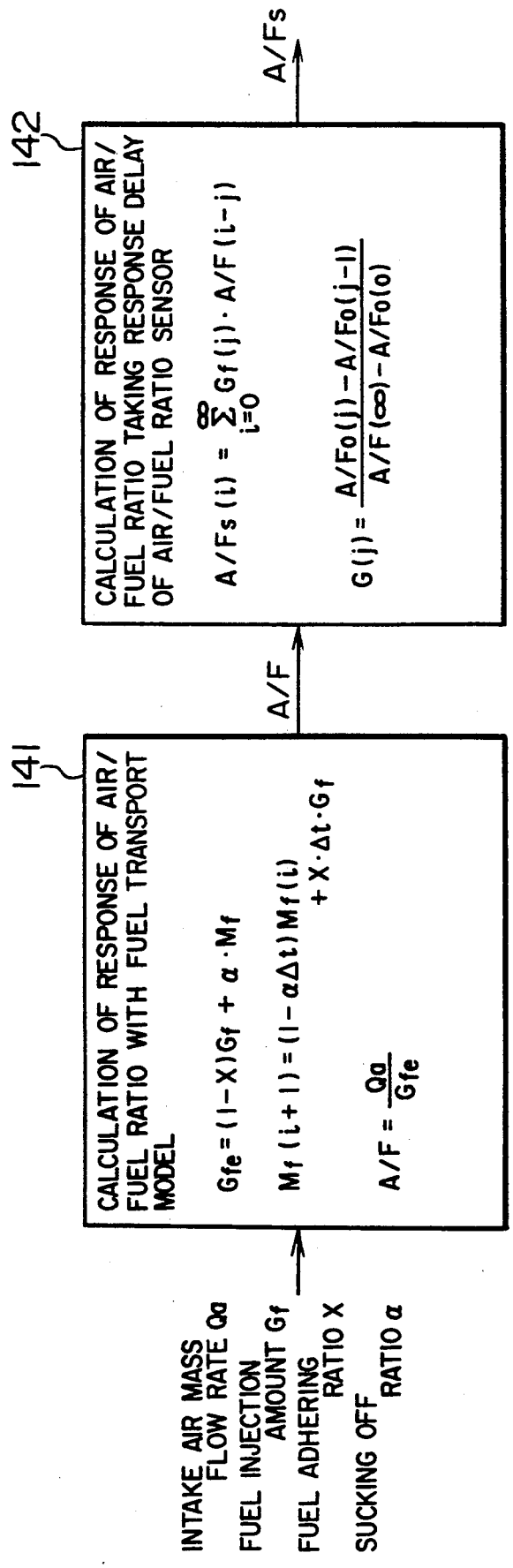
Figure 15:
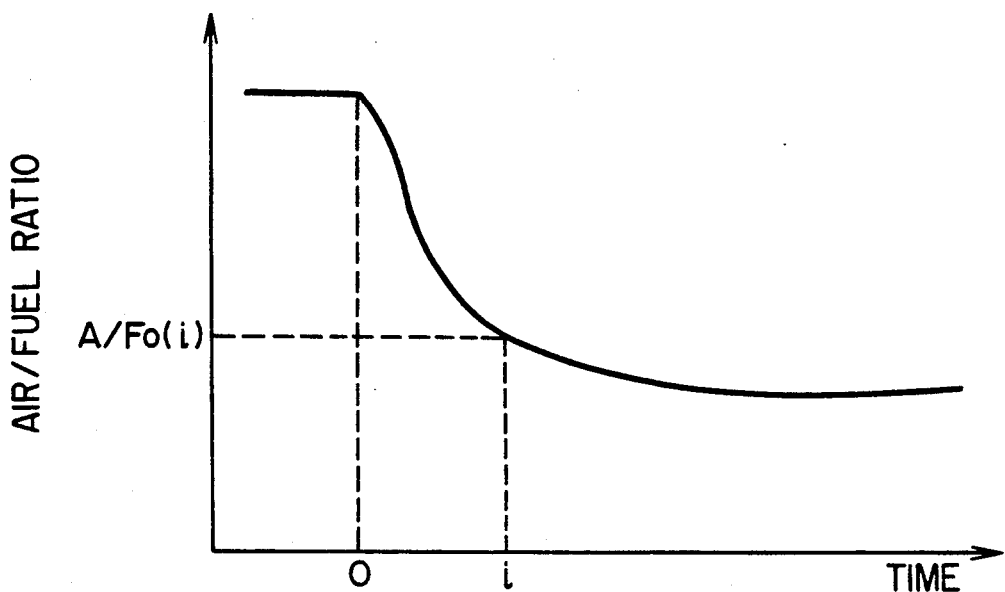

FIG. 14 block diagram showing process for calculation of response of an air/fuel ratio;

FIG. 15 is a chart showing response characteristics of an air/fuel ratio sensor

Figure 16:
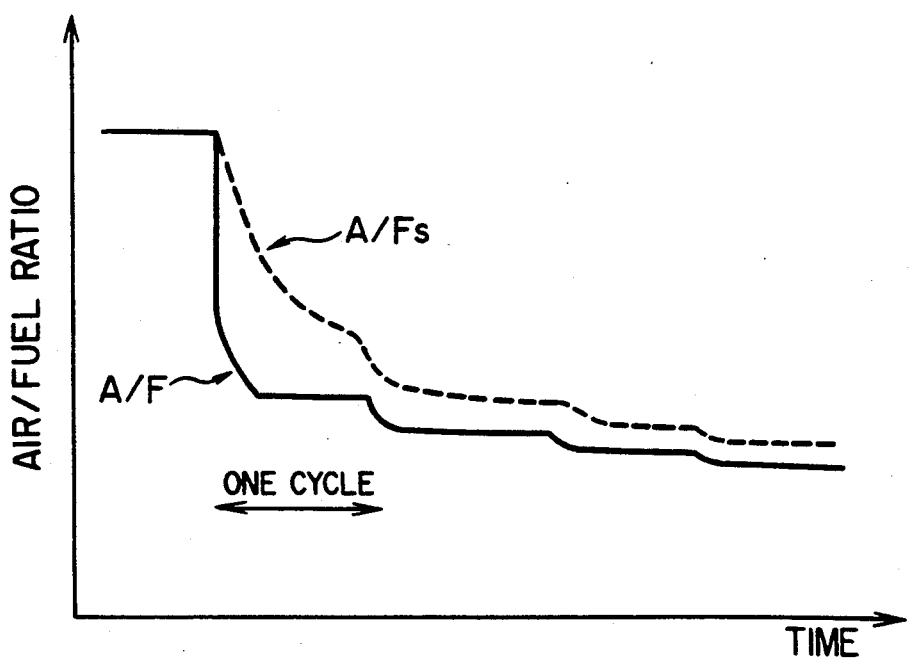
Figure 17:
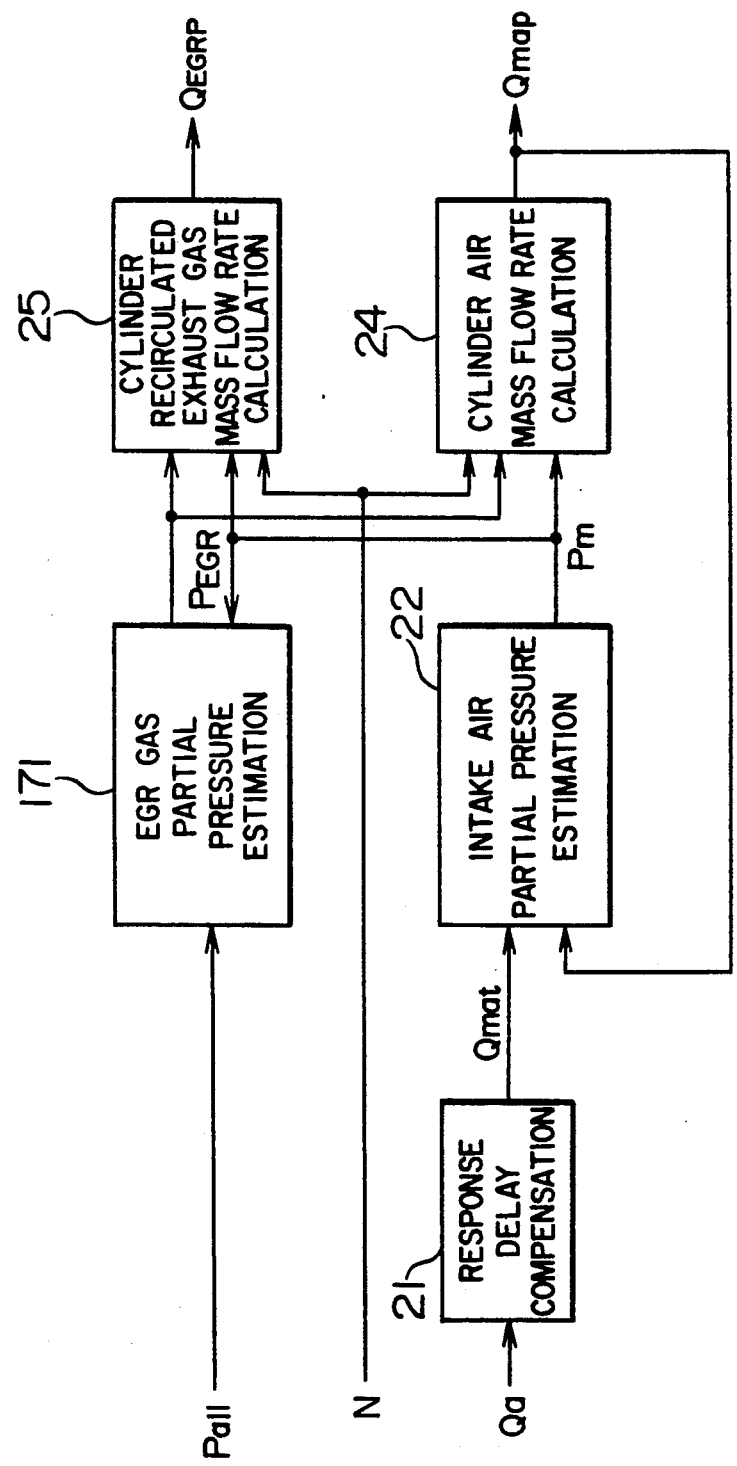
Figure 18:
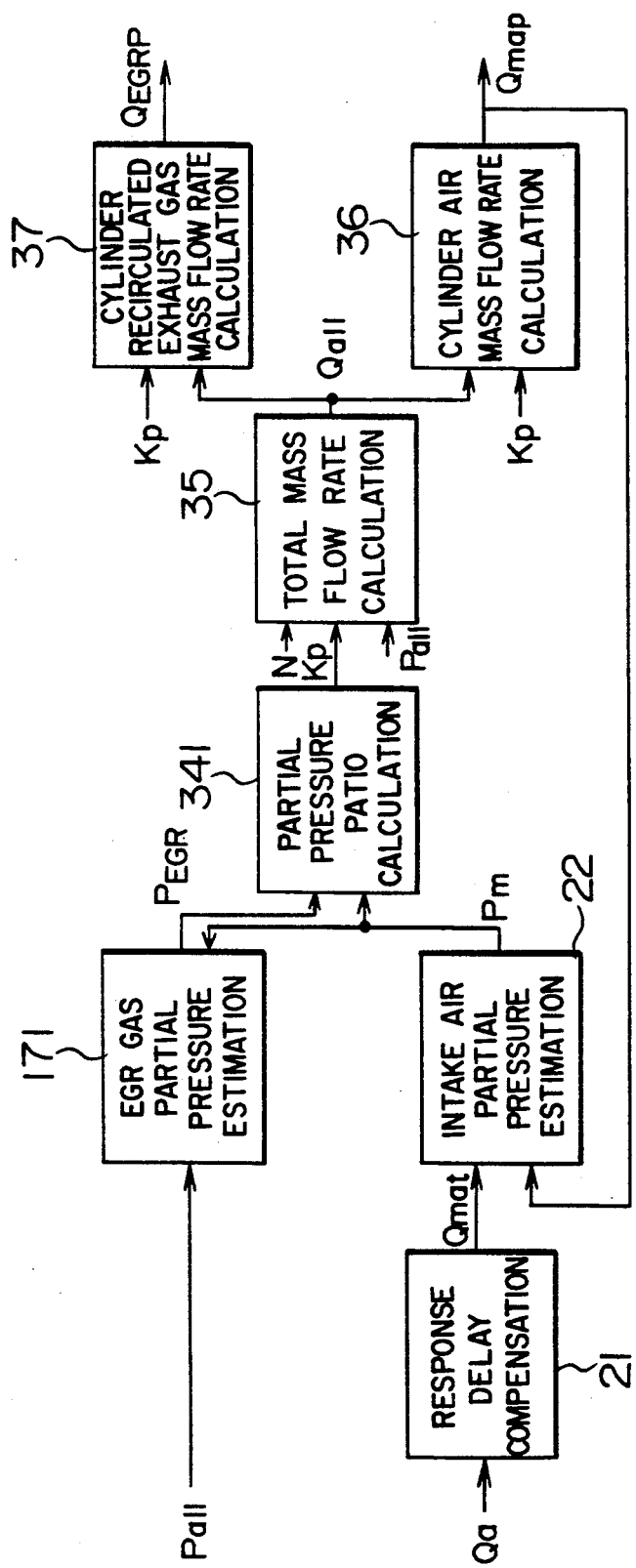
Figure 19:
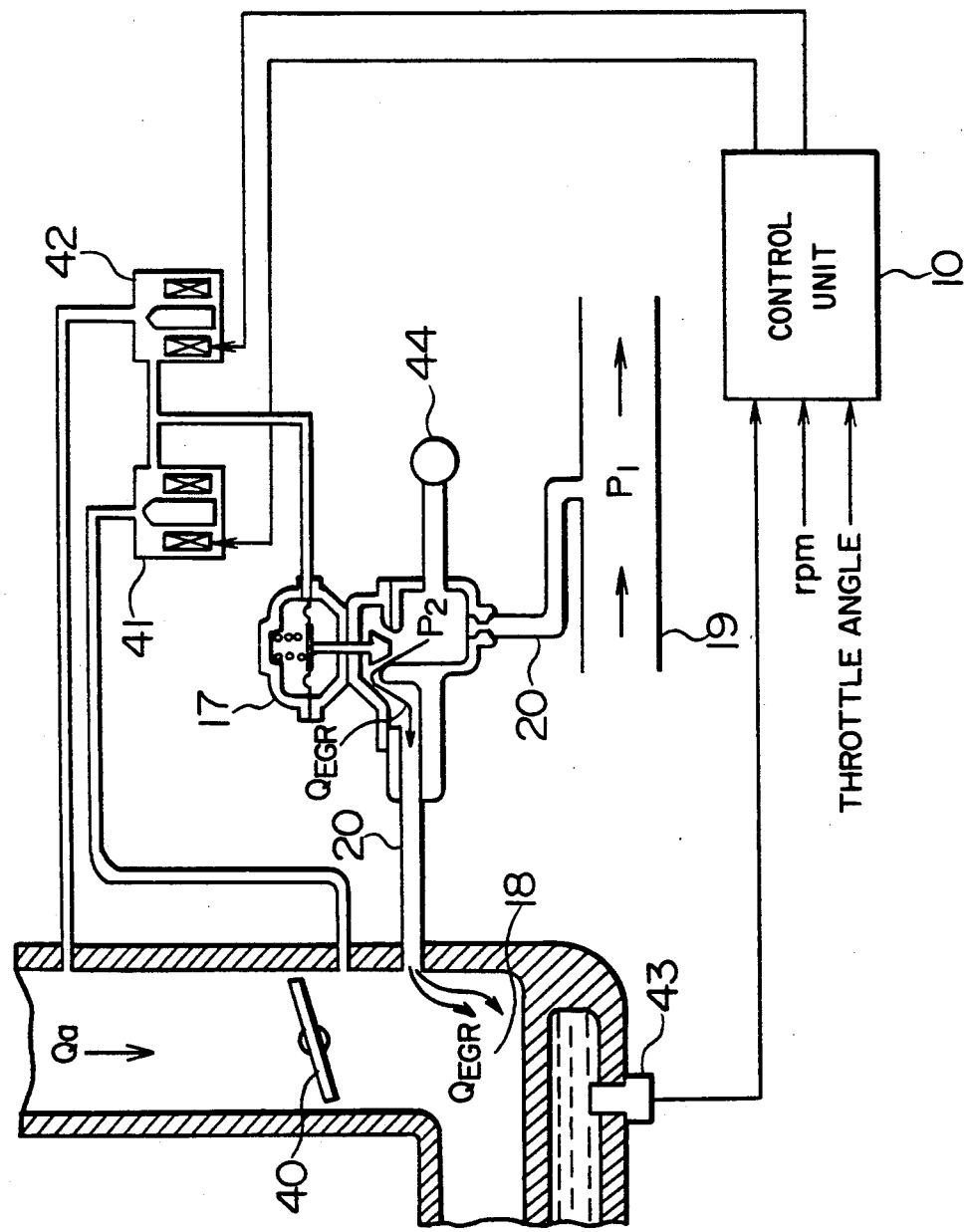
Figure 20:
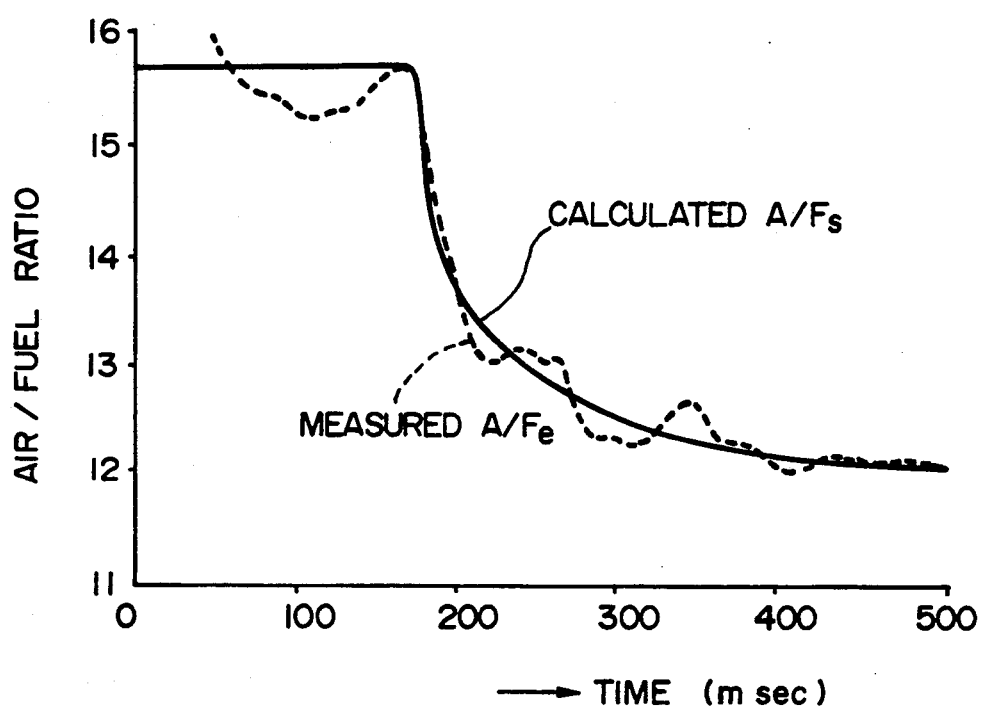

FIG. 16 is a chart showing an example of calculation of response of air/fuel ratio;

FIG. 17 is a block diagram showing method of the present invention for deriving a cylinder air mass flow rate in another electronic engine control system of a type employing the air flow sensor and the intake air pressure sensor;

FIG. 18 is a block diagram showing another method of the present invention for deriving cylinder air mass flow rate in a further electronic engine control system of a type employing the air flow sensor and the intake air pressure sensor;

FIG. 19 is a schematic diagram showing a practical example of an EGR system; and FIG. 20 is a chart showing an example of calculation of response of air/fuel ratio.

DESCRIPTION OF THE PREFERRED EMBODIMENTS

The preferred embodiments of the present invention will be discussed herebelow with reference to the accompanying drawings.

Figure 1:
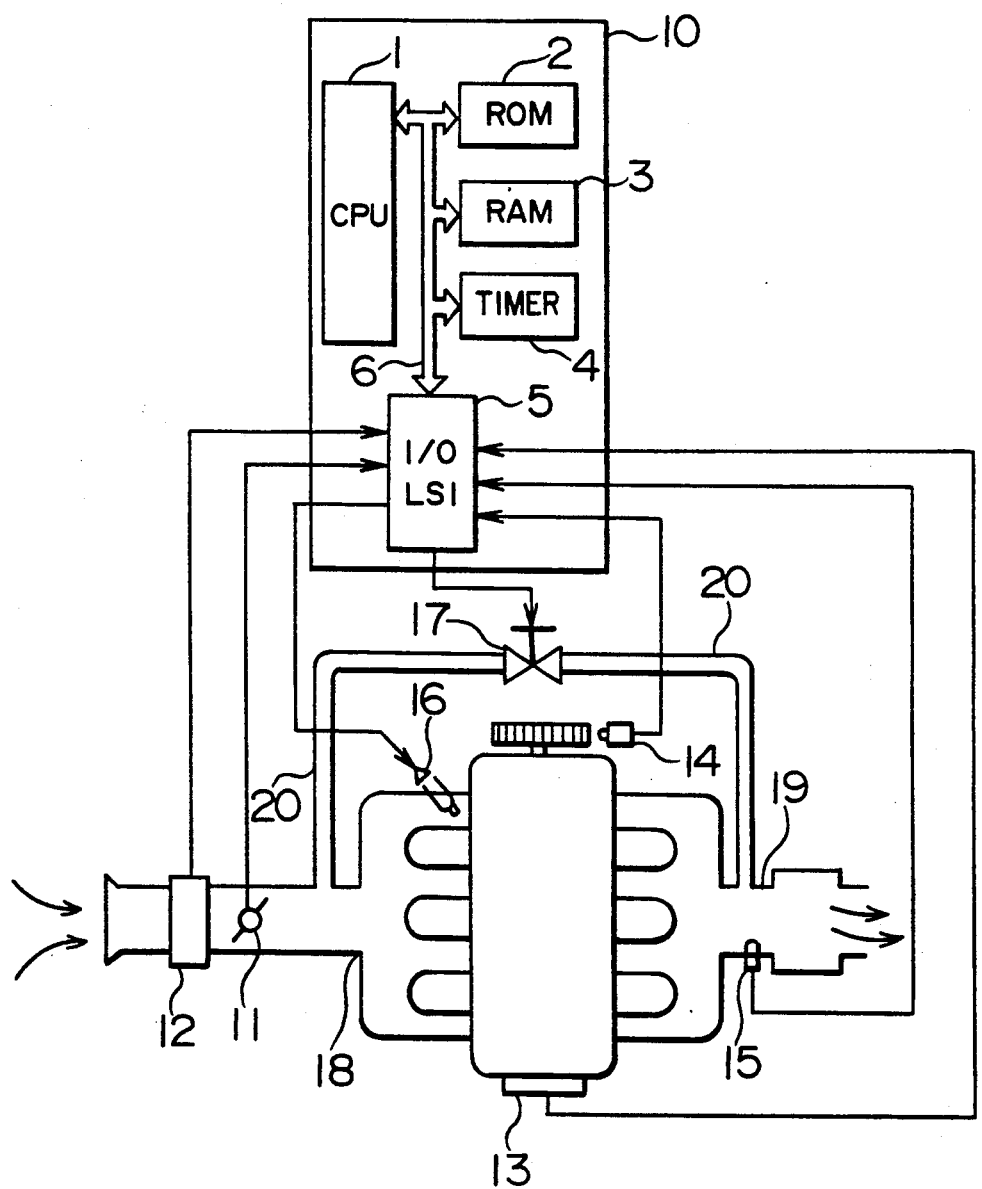
FIG. 1 is a block diagram showing overall construction of an electronic engine control system of a type employing an air flow sensor, to which a control method according to the present invention is applied.

FIG. 1 shows the overall construction of a control system as implemented by a digital control unit. A control unit 10 includes CPU 1, ROM 2, RAM 3, a timer 4, I/O LSI circuit 5 and bus 6 which electrically connecting these elements. Detecting information from a throttle angle sensor 11, an intake air mass flow rate sensor 12, an engine coolant temperature sensor 13, a crank angle sensor 14 and an oxygen ($O_2$) sensor 15 are written in the RAM 3 through the I/O LSI circuit 5. On the other hand, a fuel injection valve drive signals for fuel injection valves 16 (only for one cylinder is shown for simplification of illustration) are output through the I/O LSI circuit 5. Here, a mechanical or electronically controlled EGR system as shown in FIG. 19, is employed. A mass flow rate $Q_{EGR}$ of a recirculated exhaust gas is detected through a predetermined arithmetic operation. An EGR valve 17 is disposed within an exhaust gas recirculation pipe 20 which connects an air intake manifold 18 and an exhaust manifold 19. In case of an electronically controlled EGR valve, an EGR signal is provided from the control unit 10 to the EGR valve 17 for controlling valve open ratio for recirculating the desired amount of the exhaust gas.

Here, discussion will be given for the EGR system shown in FIG. 19. The EGR system shown in FIG. 19 is the electronically controlled EGR valve of the internal combustion engine, to which the method according to the present invention is applied. The exhaust gas recirculation amount through the EGR valve 17 is controlled by controlling pressure difference between upstream and downstream ports of a throttle valve 40 in a throttle chamber through duty control for two electromagnetic valves 41 and 42. The electromagnetic valves 41 and 42 are controlled by an EGR control signal from the control unit 10. The EGR control signal is derived by the control unit 10 on the basis of a throttle valve open angle, the engine speed and an engine coolant temperature measured by the engine coolant temperature sensor 43 and output of the pressure sensor 44 and so forth. It should be noted that the EGR system, to which the method of the invention, is not specified to the specific construction of the EGR system shown in FIG. 19 and can be any other constructions of systems.

Next, for example, the mass flow rate $Q_{EGR}$ of the recirculated exhaust gas can be derived indirectly on the basis of a target EGR ratio $r_{EGR}$ and a measured intake air mass flow rate $Q_a$ through the following equation:

$$Q_{EGR} = \frac{\frac{r_{EGR}}{100}}{1 - \frac{r_{EGR}}{100}} \times Q_a$$

On the other hand, the exhaust gas mass flow amount $Q_{EGR}$ can also be derived through the following equation. In this case, the pressure $P_2$ upstream of an orifice is detected by an absolute pressure sensor 44. Based on the pressure detecting value $P_2$, the exhaust gas mass flow amount $Q_{EGR}$ can be expressed by:

$$Q_{EGR} = C \times S \times \sqrt{P_2 - P_1}$$

where
C: flow coefficient
S: cross sectional area of the orifice
$P_1$: exhaust gas pressure (about 1 bar)

Since the electronic control unit cannot calculate the root operation, the control unit looks up a table wherein the data of root operation are stored, so as to get the value of $$\sqrt{P_2 - P_1}$$

The value of $Q_{EGR}$ can be obtained by the methods disclosed in Japanese Unexamined Patent Publications Nos. JP-A-63-208657 and JP-A-63-239352.

Figure 2:
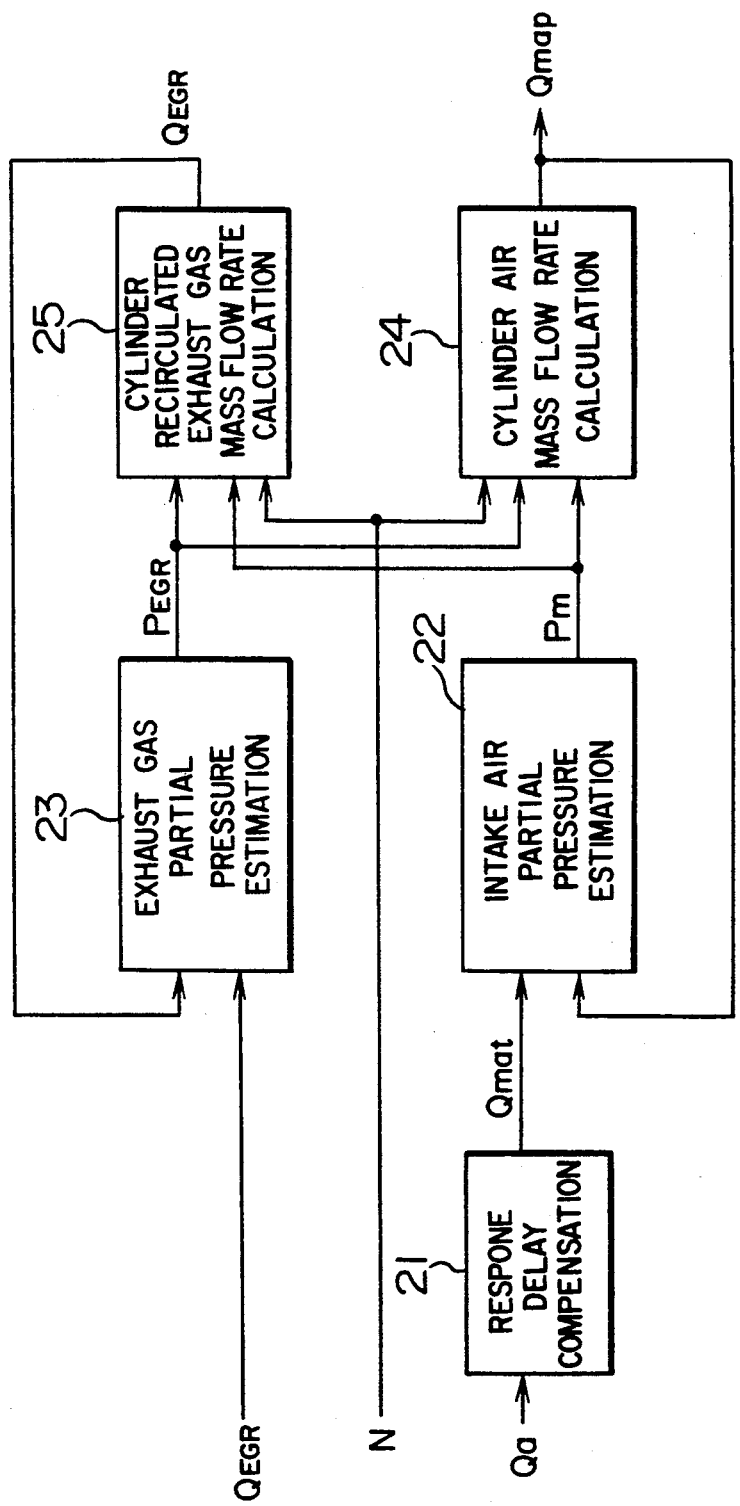
FIG. 2 is a block diagram showing method of the present invention for deriving a cylinder air mass flow rate.

Next, with reference to FIGS. 2 and 3, discussion will be made for methods for deriving cylinder air mass flow rate during active state of EGR control. FIG. 2 show a discrete block diagram showing process of deriving the cylinder air mass flow rate in the active state of the EGR control in the system of FIG. 1. The shown process includes five processes of a process for compensating delay of response of the intake air flow amount sensor 12, a process for estimating partial pressure of air in the air intake manifold 18, a process for estimating partial pressure of the exhaust gas in the air intake manifold 18, a process for calculating a cylinder air mass flow rate $Q_{map}$, and a process for calculating an exhaust gas mass flow rate $Q_{EGRP}$ to be actually introduced into the engine cylinder (cylinder recirculated exhaust gas mass flow rate). Discussion for respective process will be given herebelow.

At first, in a response delay compensating process stage 21, an actual air flow amount $Q_{mat}$ at a position where the air flow amount sensor is located, is calculated by processing the air flow amount $Q_a$ measured by an air flow sensor 12 according to the following equation (1). Hereafter, this air mass flow rate will be referred to as "throttle air mass flow rate". The input and output characteristics of the air flow sensor 12 is a secondary delay system, the equation (1) is established for estimating the actual intake air mass flow rate $Q_{mat}$ by providing secondary advance compensation for the output $Q_a$ of the air flow sensor 12.

$$Q_{mat}(i) = \frac{\frac{2T_1T_2}{\Delta t^2} - 1}{\frac{T_1T_2}{\Delta t^2} + \frac{T_1T_2}{2\Delta t}} Q_{mat}(i-1) - \tag{1}$$

$$\frac{\frac{T_1T_2}{\Delta t^2} - \frac{T_1 + T_2}{2\Delta t}}{\frac{T_1T_2}{\Delta t^2} + \frac{T_1 + T_2}{2\Delta t}} Q_{mat}(i-2) +$$

$$\frac{\frac{T_3}{2\Delta t}}{\frac{T_1T_2}{\Delta t^2} + \frac{T_1 + T_2}{2\Delta t}} Q_a(i) -$$

$$\frac{\frac{T_3}{2\Delta t}}{\frac{T_1T_2}{\Delta t^2} + \frac{T_1 + T_2}{2\Delta t}} Q_a(i-2) +$$

$$\frac{1}{\frac{T_1T_2}{\Delta t^2} + \frac{T_1 + T_2}{2\Delta t}} Q_a(i-1)$$

where
$Q_a$: measured air mass flow rate;
$Q_{mat}$: throttle air mass flow rate at the throttle;
i: time (1 time corresponds a period $\Delta t$);
$T_1$-$T_3$: time constant of delay of the sensor response;
$T_1 = 10 \sim 20$ ms;
$T_2 = 50 \sim 80$ ms; and
$T_3 = 100 \sim 150$ ms In a block 22, the partial pressure $P_m$ of the intake air in the intake manifold is estimated and updated through the following equation:

$$Pm(i+1) = Pm(i) + \frac{RT_m}{M_{air}V_m} \Delta t (Q_{mat} - Q_{map}) \tag{2}$$

where
$Q_{mat}$: throttle air mass flow rate estimated;
$Q_{map}$: cylinder air mass flow rate estimated value;
$P_m$: intake manifold component air pressure estimated value;
$T_m$: gas temperature (set about 350° K.) in the intake manifold;
$V_m$: intake manifold volume (predetermined constant)
i: time (1 time corresponds a period $\Delta t$);
$M_{air}$: average molecular weight of air In a block 23, the partial pressure $P_{EGR}$ of the exhaust gas in the intake manifold is estimated through the following equation and the value of $P_{EGR}$ is updated per every unit time ($\Delta t$).

$$P_{EGR}(i+1) = P_{EGR}(i) + \frac{RT_m}{M_{EGR}V_m} \Delta t (Q_{EGR} - Q_{EGRP}) \tag{3}$$

where
$Q_{EGR}$: detected value of mass flow rate of exhaust gas flowing into the intake manifold;

$Q_{EGRP}$: estimated value of mass flow rate of exhaust gas flowing into the engine cylinder;

$P_{EGR}$: estimated value of partial pressure of the exhaust gas in the intake manifold $T_m$: gas temperature (set about 350° K.) in the intake manifold;

$V_m$: intake manifold volume (predetermined constant)

i: time (1 time corresponds a period $\Delta t$);

$M_{air}$ average molecular weight of the exhaust gas.

When the engine control system has an intake gas temperature sensor for the intake manifold, the measured value can be used as the value of $T_m$ in the equations (2) and (3).

In a block 24, the cylinder air mass flow rate $Q_{map}$ is derived through the following formula:

$$Q_{map} = f(P_m, P_{EGR}, N) \quad (4)$$

where $P_m$: intake manifold air partial pressure;
$P_{EGR}$: intake manifold exhaust gas partial pressure;
N: engine speed;
f: predetermined function The formula (4) shows the cylinder air mass flow rate $Q_{map}$ can be determined by a function taking three parameters of the intake manifold air partial pressure $P_m$, the intake manifold EGR gas partial pressure $P_{EGR}$ and the engine speed N as variables. In practice, it is difficult to mathematically determine the function to express the foregoing formula (4). Accordingly, in the present invention, by experimentally measuring the value of $Q_{map}$ determined by the three parameters at various values of the three variables N, $P_m$ and $P_{EGR}$ under steady state of engine running condition, a three dimensional table to define the values of $Q_{map}$ with the variables N, Pm and $P_{EGR}$ id determined. When the variables N, $P_m$ and $P_{EGR}$ are provided, the value of $Q_{map}$ can be determined through the table look-up against the three dimensional table in terms of these three variables. The three dimensional table representative of the foregoing formula (4) is stored in the memory of the control unit 10.

Although the engine speed N and the intake air mass flow rate $Q_{map}$ can be directly measured, two variables among the foregoing three variables, i.e. the intake manifold air partial pressure $P_m$ and the intake manifold EGR gas partial pressure $P_{EGR}$ cannot be measured directly. Therefore, these variables are detected indirectly through the process set out below.

It is assumed that the respective of the mass weights of the air and the EGR gas are respectively $m_{air}$ and $m_{EGR}$ at the engine steady state. The ratio of the mass weight equal to the ratio of the mass flow rates of the air and the EGR gas flowing into the engine cylinder. Accordingly, the following relational equation can be established.

$$m_{air} : m_{EGR} = Q_a : Q_{EGR} \quad (5)$$

where $Q_a$: measured intake air mass flow rate; and
$Q_{EGR}$: exhaust gas flow rate to the intake manifold.

On the other hand, by applying the ideal gas state equation for the air and the exhaust gas in the intake manifold, the following two equations can be established:

$$P_m V_m = \frac{m_{air}}{M_{air}} R T_m \quad (6)$$

$$P_{EGR} V_m = \frac{m_{EGR}}{M_{EGR}} R T_m \quad (7)$$

where $P_m$: the estimated value of the intake manifold air partial pressure $P_{EGR}$: the estimated value of the intake manifold EGR gas composite pressure;

$m_{air}$: the mass weight of the air in the intake manifold;

$m_{EGR}$: the mass weight of the exhaust gas in the intake manifold;

$M_{air}$: an average molecular weight of the air (constant);

$M_{EGR}$: an average molecular weight of the exhaust gas (constant);

$V_m$: volume of the intake manifold;

$T_m$: the gas temperature with the intake manifold;

R: gas constant

From the equations (5) to (7), the ratio of the partial pressure of the air and the partial pressure of the exhaust gas can be derived through the following equation:

$$P_m : P_{EGR} = \frac{Q_a}{M_{air}} : \frac{Q_{EGR}}{M_{EGR}} \quad (8)$$

Accordingly, by deriving a total gas pressure $P_{all}$ of the gas in the intake manifold through direct measurement by means of the pressure sensor the partial pressure $P_m$ of the intake air and the partial pressure $P_{EGR}$ of the EGR gas can be derived through the following two equations:

$$P_m = \frac{\frac{Q_a}{M_{air}}}{\frac{Q_a}{M_{air}} + \frac{Q_{EGR}}{M_{EGR}}} P_{all} \quad (9)$$

$$P_{EGR} = \frac{\frac{Q_{EGR}}{M_{EGR}}}{\frac{Q_a}{M_{air}} + \frac{Q_{EGR}}{M_{EGR}}} P_{all} \quad (10)$$

Accordingly, when the total gas pressure $P_{all}$ in the intake manifold, the intake air mass flow rate $Q_a$ into the intake manifold and the EGR gas flow rate $Q_{EGR}$ into the intake manifold are detected, the partial pressure $P_m$ of the intake air in the intake manifold and the partial pressure $P_{EGR}$ of the EGR gas in the intake manifold can be derived through the equations (9) and (10). It should be appreciated that the EGR gas flow rate $Q_{EGR}$ can be derived through the process as discussed with reference to FIG. 19.

By deriving the partial pressure $P_m$ of the intake air in the intake manifold and the partial pressure $P_{EGR}$ of the EGR gas in the intake manifold through the equation (9) and (10), and in addition, by detecting the engine speed N and the cylinder air mass flow rate $Q_{map}$, the three dimensional table representative of the foregoing formula (4) can be established. It should be noted that, at the steady state of the intake air mass flow rate (stable at constant value), the cylinder air mass flow rate $Q_{map}$ is equal to the measured intake air mass flow rate $Q_a$ measured by the air flow sensor 12 located in the vicinity of the inlet of the intake manifold. Therefore, at the steady state of the engine, the measured intake air mass flow rate $Q_a$ can be used as the value of $Q_{map}$.

In the foregoing three dimensional table representative of the formula (4), it is required to derive three variables simultaneously. As a result, the amount of data to be handled becomes large and, as a consequence, the required capacity of memory become large. Accordingly, in practice, in order to reduce the data amount in the extent not to significantly influence for the accuracy, the foregoing formula (4) may be approximated by two dimensional table and one dimensional table. The process for such approximation will be discussed herebelow.

The following equation (11) expresses the cylinder air mass flow rate $Q_{map}$ by a product of a function $f_1$ determined by two parameters of the engine speed N and the intake manifold air partial pressure $P_m$ and an EGR amount correcting function $f_2$ determined by the EGR gas partial pressure $P_{EGR}$ in the intake manifold and the intake air partial pressure $P_m$ in the intake manifold. In practice, the function $f_1$ is preliminarily derived by measuring the engine speed N, the air partial pressure $P_m$ and the cylinder air mass flow rate $Q_{map}$ ($Q_a$ at the steady state) through experiments and is established as a two dimensional table for $Q_{map}$ stored in the memory to be looked up in terms of N and $P_m$. Also, the function $f_2$ is also set as one dimensional table through experiments and stored in the memory. During actual engine operation, the value of $Q_{map}$ of the equation (11) can be derived by calculating the product of the values derived by looking u two tables in the memory. Other than the equation (11), $Q_{map}$ can be derived through the equations (12) and (13). In either case, the values are determined using the two dimensional table and one dimensional table.

$$Q_{map} = f_1(P_m, N) f_2\left(\frac{P_{EGR}}{P_m}\right) \quad (11)$$

$$Q_{map} = f_3(P_m, N) f_4(P_{EGR}) \quad (12)$$
$$Q_{map} = f_5(P_m, P_{EGR}) f_6(N) \quad (13)$$

Furthermore, manner for establishing respective functions $f_1$ to $f_2$ in the equations (11), (12) and (13) will be discussed herebelow.

By solving the equation (11) with respect to the function $f_1$, the following equation can be established.

$$f_1(P_m, N) = \frac{Q_{map}}{f_2\left(\frac{P_{EGR}}{P_m}\right)} \quad (14)$$

From the foregoing equation, by driving the engine at the steady state, and maintaining the ratio of the partial pressure $P_{EGR}$ of the EGR gas versus the partial pressure $P_m$ of the intake air constant ($f_2(P_{GR}/P_m)$=constant), and by measuring the intake air mass flow rate $Q_a$ at the steady state at various intake air partial pressure $P_m$ and the engine speed N, the two dimensional table of the function $f_1$ can be derived from the following equation:

$$f_1(P_m, N) = k_1 \cdot Q_a(P_m, N) \quad (15)$$

where $k_1$: constant

Similarly, at the steady state of the engine, with maintaining the intake air partial pressure $P_m$ and the engine speed N constant, and by varying the ratio ($P_{EGR}/P_m$) of the partial pressure $P_{EGR}$ versus the partial pressure $P_m$ of the intake air to measure the intake air mass flow rate $Q_a$ (=$Q_{map}$), the one dimensional table of the function $f_2$ can be established based on the measure value $Q_a$ ($P_{EGR}/P_m$) through the following equation:

$$f_2\left(\frac{P_{EGR}}{P_m}\right) = k_2 Q_a\left(\frac{P_{EGR}}{P_m}\right) \quad (16)$$

where $k_2$: constant

The values of the constants $k_1$ and $k_2$ are determined so that the cylinder air mass flow rate $Q_{map}$ derived through the equations (11), (15) and (16) becomes consistent with the actually measured value of $Q_{map}$ at the engine operating condition under the same condition.

Tables corresponding to the functions $f_3$, $f_4$, $f_5$ and $f_6$ can be established in the similar manner.

Though the foregoing method derives the cylinder air mass flow rate $Q_{map}$ on the basis of the partial pressure $P_m$ of the intake air, the partial pressure $P_{EGR}$ of the EGR gas and the engine speed N, it is possible to use a cylinder recirculated exhaust gas mass flow rate $Q_{EGRP}$ derived through the process of a block 25 discussed later, in place of the partial pressure of the exhaust gas.

On the other hand, as variables to influence for the cylinder air mass flow rate $Q_{map}$, a gas temperature in the intake manifold, an ambient pressure and so forth can be considered in addition to above-mentioned three variables. Accordingly, it is possible to derive the cylinder air mass flow rate $Q_{map}$ with taking the gas temperature and/or the ambient pressure in addition to the foregoing three variables. The gas temperature in the intake manifold can be detected by providing a temperature sensor (not shown) in the intake manifold 18. Also, in order to detect the ambient air, an ambient pressure sensor (not shown) may be provided.

Next, discussion will be given for arithmetic operation for deriving the cylinder recirculated exhaust gas mass flow rate $Q_{EGRP}$ of block 35. A factor significantly influencing for the cylinder recirculated exhaust gas mass flow rate $Q_{EGRP}$ are the partial pressure $P_{EGR}$ of the EGR gas in the intake manifold, the partial pressure $P_m$ of the intake air and the engine speed N. Accordingly, the cylinder recirculated exhaust gas mass flow rate $Q_{EGRP}$ is derived by:

$$Q_{EGRP} = g(P_{EGR}, P_m, N) \quad (17)$$

where
$Q_{EGRP}$: recirculated exhaust gas mass flow rate flowing into the cylinder;
$P_{EGR}$: partial pressure of the exhaust gas
$P_m$: partial pressure of intake air;
N: engine speed;
g: predetermined function.

Here, the function g corresponds to a table storing the amount of the recirculated exhaust gas flowing into the engine cylinder, i.e. the cylinder recirculated exhaust gas mass flow rate, under the steady state of the engine. The function g has three dimensional variables similarly to the formula (4) and thus practically difficult to determine the function. Accordingly, a three dimensional table is experimentally established in the similar manner to that for the formula (4). The three dimensional table thus established is stored in the memory so that it may be looked up upon deriving the cylinder recirculated exhaust gas mass flow rate $Q_{EGRP}$.

When it is desired to reduce the table data and the memory capacity, the cylinder recirculated exhaust gas mass flow rate $Q_{EGRP}$ is derived by the following approximated equation.

$$Q_{EGRP} = g_1(P_{EGR}, N) g_2\left(\frac{P_{EGR}}{P_m}\right) \tag{18}$$

where $g_1$ and $g_2$: given functions $$Q_{EGRP} = g_3(P_{EGR}, N) g_4 P_m \tag{19}$$

where $g_3$ and $g_4$: given functions $$Q_{EGRP} = g_5(P_{EGR}, P_m) g_6 N \tag{20}$$

where $g_5$ and $g_6$: given functions

The foregoing functions $g_1$ to $g_6$ corresponds to tables. The table data can be derived in the same manner as those of the equations (14), (15) and (16). Though the foregoing method derives the cylinder recirculated exhaust gas mass flow rate on the basis of the partial pressure $P_m$ of the intake air, the partial pressure $P_{EGR}$ of the EGR gas and the engine speed N, it is possible to use the cylinder air mass flow rate $Q_{map}$ derived in the process of the block 24 in place of the partial pressure $P_m$. Also, it is possible to use the data of gas temperature in the intake manifold and the atmospheric pressure as additional parameters for deriving the recirculated exhaust gas mass flow rate $Q_{EGRP}$.

The foregoing is the process for deriving the cylinder air mass flow rate during active state of the EGR control, to be implemented by the construction of FIG. 2.

Next, the second method for deriving the air mass flow rate flowing into the cylinder during active state of the EGR control will be discussed with reference to FIG. 3.

The process to be performed in the blocks 21, 22 and 23 are the same as those performed in the corresponding blocks of FIG. 2. In a block 34, based on the estimated partial pressure $P_m$ of the intake air and the estimated pressure $P_{EGR}$ of the EGR gas, the total pressure $P_{all}$ in the intake manifold and the partial pressure ratio $K_p$ are derived through the following equations:

$$P_{all} = P_m + P_{EGR} \tag{21}$$

where
$P_{all}$: total pressure in the intake manifold $$K_p = \frac{P_{EGR}}{P_m} \tag{22}$$

where $K_p$: partial pressure ratio

In a block 35, a total mass flow rate $Q_{all}$ flowing into the engine cylinder is calculated on the basis of the calculated total pressure, the partial pressure ratio and the engine speed through the following equation:

$$Q_{all} = h(P_{all}, K_p, N) \tag{23}$$

where h: given function

The function h includes three parameters. Therefore, similarly to the case of the formula (4) and (17), it is represented by a three dimensional table storing the total mass flow rate of the intake air and the exhaust gas flowing into the engine cylinder, during the steady state of the engine. This three dimensional table is stored in the memory so that the total mass flow rate $Q_{all}$ can be derived through table look-up. The three dimensional table data can be derived experimentally in the similar manner to the foregoing. On the other hand, it is possible to approximate the foregoing formula (23) with the following equations in order to reduce the table data amount and the memory capacity.

$$Q_{all} = h_1(P_{all}, N) \cdot h_2(K_p) \tag{24}$$

where $h_1$ and $h_2$: given functions $$Q_{all} = h_3(P_{all}, K_p) \cdot h_4(N) \tag{25}$$

where $h_3$ and $h_4$: given functions

It should be appreciated that with taking an assumption that the total mass flow rate flowing into the engine cylinder does not depends upon the partial pressure ratio (corresponding to an average molecular weight of the gas in the intake manifold), the total mass flow rate $Q_{all}$ can be derived through the following equation:

$$Q_{all} = \frac{P_m M_{air} + P_{EGR} M_{EGR}}{P_{all}} h_5(P_{all}, N) \tag{26}$$

where $h_5$ is a given function

In the foregoing equation, $(P_m \cdot M_{air} + P_{EGR} \cdot M_{EGR})/P_{all}$ is the average molecular weight of the gas in the intake manifold. The function $h_5$ cam be expressed by two dimensional table determined through the experiments. The two dimensional table is stored in the memory so that the data $h_5(P_{all}, N)$ can be derived by table look-up thereagainst. The table data can be derived by detecting $Q_{all}$, $P_m$ and $P_{EGR}$ at the engine steady state and replacing with the variables in the equation (26) for deriving the function $h_5$ at various engine driving ranges.

Next, discussion will be given for the process in a block 36. Here, on the basis of the partial pressure ratio $K_p$, the total mass flow rate $Q_{all}$ flowing into the engine cylinder, the cylinder air mass flow rate $Q_{map}$ is derived by the following equation:

$$Q_{map} = \frac{1}{1 + K_p \frac{M_{EGR}}{M_{air}}} Q_{all} \tag{27}$$

In a block 37, the Cylinder recirculated exhaust gas mass flow rate $Q_{EGRP}$ is calculated by the following equation:

$$Q_{EGRP} = \frac{K_p \frac{M_{EGR}}{M_{air}}}{1 + K_p \frac{M_{EGR}}{M_{air}}} Q_{all} \tag{28}$$

Figure 3:
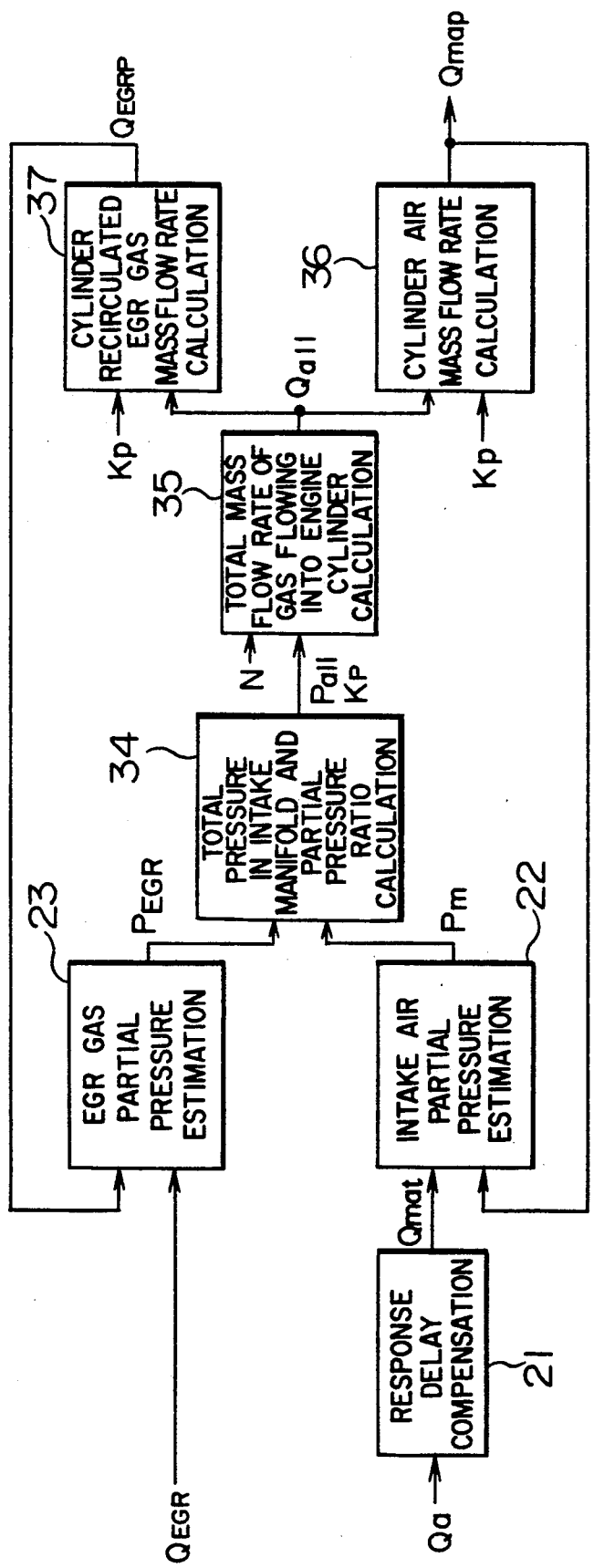
FIG. 3 is a block diagram showing another method of the present invention for deriving the cylinder air mass flow rate.

The foregoing are the process for deriving the cylinder air mass flow rate in accordance with the second method of FIG. 3.

Figure 4:
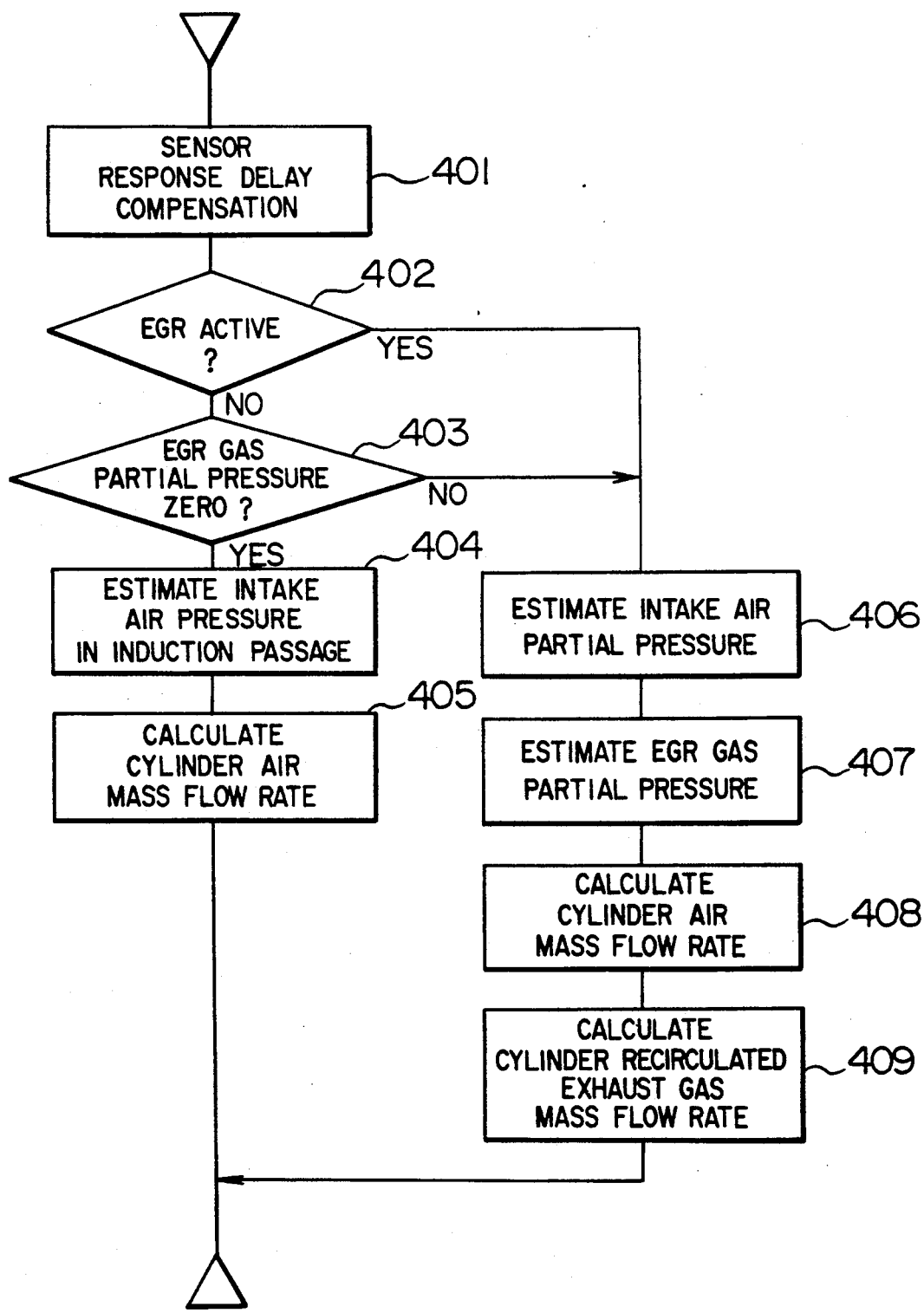
FIG. 4 is a flowchart showing a method of FIG. 2 for deriving the cylinder air mass flow rate.
Figure 5:
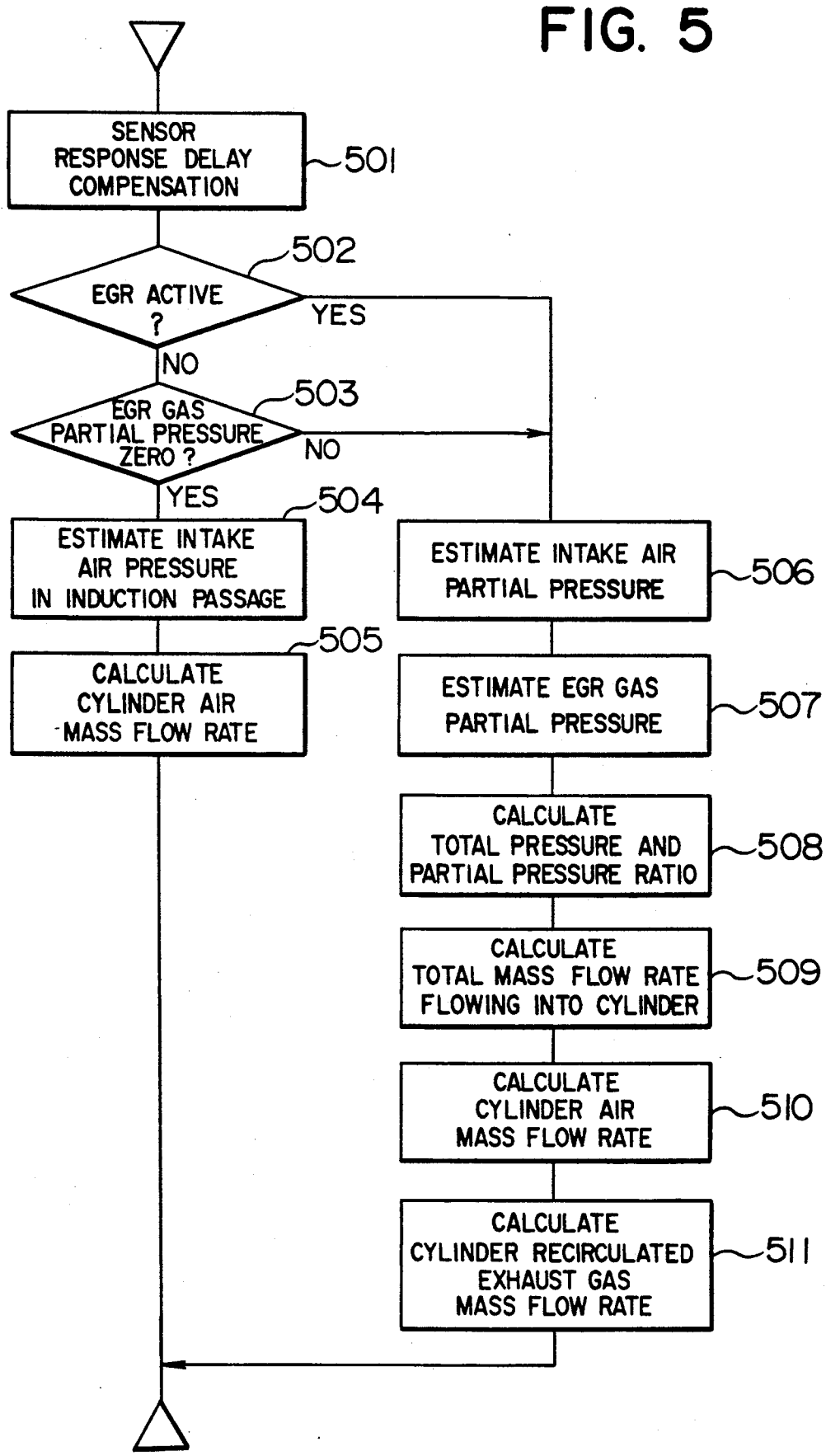
FIG. 5 is a flowchart showing a method of FIG. 3 for deriving the cylinder air mass flow rate.

Next, the operation of control programs for implementing the method of deriving the cylinder air mass flow rate of FIGS. 2 and 3 with the digital control unit of FIG. 1 with reference to FIGS. 4 and 5. FIG. 4 shows the program corresponding to the method of FIG. 2. This program is stored in the ROM 2 and periodically executed with a given interval. At first, at a step 401, the measured intake air mass flow rate is processed for sensor response delay compensation of the equation (1) to derive the actual intake air mass flow rate $Q_{mat}$ at the position where the intake air flow sensor is provided.

Next, at a step 402, check is performed whether EGR is ON or OFF to know if the EGR control is active (EGR valve is opened). If EGR control is not active, the process is advanced to a step 403. In case of the electronically controlled EGR system, a predetermined flag will be set and reset at a predetermined address of the control program depending upon active and inactive states of the EGR control.

At a step 403, check is performed whether the partial pressure of the EGR gas in the intake manifold, which is calculated at the later step, is zero or not. If the EGR gas partial pressure is 0 as checked at the step 403, the process is advanced to a step 404. On the other hand, when the EGR gas partial pressure is not 0, judgement is made that the exhaust gas is maintained in the intake manifold and thus process is advanced to the processes of a sequence starting at a step 406.

At a step 404, the partial pressure $P_m$ is updated by the foregoing equation (2).

Subsequently, at a step 405, table look-up is performed against table of the cylinder air mass flow rate $Q_{map}$ in terms of the partial pressure $P_m$ and the engine speed N adapted to the steady state of the engine under inactive state of the EGR control, for deriving the cylinder air mass flow rate $Q_{map}$. Then, process goes END.

Next, the sequence of process starting at the step 406 for deriving the cylinder air mass flow rate during the active state of the EGR control, will be discussed.

At the step 406, the partial pressure $P_m$ of the intake air in the intake manifold is estimated through the equation (2) and is updated.

At a step 407, the partial pressure $P_{EGR}$ of the EGR gas in the intake manifold is estimated and updated using the equation (3).

Then, at a step 408, the cylinder air mass flow rate $Q_{map}$ is calculated by one of the formulae (4), (11), (12) and (13) on the basis of the partial pressure of the EGR gas, the partial pressure of the air and the engine speed.

Subsequently, at a step 409, the cylinder recirculated exhaust gas mass flow rate $Q_{EGRP}$ is calculated by one of the formulae (17), (18), (19) and (20) on the basis of the partial pressure of the EGR gas, the partial pressure of the air and the engine speed.

The foregoing is the process to be performed in execution of the program of FIG. 4.

Next, with reference to FIG. 5, the operation of the program corresponding to the method of deriving the cylinder air mass flow rate of FIG. 3 will be discussed. Similarly to the foregoing program of FIG. 4, the shown program is periodically executed with a given interval.

The processes in the steps 501 to 507 are the same as those in the steps 401 to 407 of FIG. 4. Therefore, discussion for those steps is neglected.

At a step 508, the total pressure $P_{all}$ and the partial pressure ratio $K_p$ of the intake air and the EGR gas is derived through the equations (21) and (22).

Then, at a step 509, the total mass flow rate $Q_{all}$ flowing into the engine cylinder is calculated using one of the equations (23) and (26).

Next, at a step 510, with using the equation (27), the cylinder air mass flow rate $Q_{map}$ is calculated. Then, at a step 511, with using the equation (28), the cylinder recirculated exhaust gas mass flow rate $Q_{EGRP}$ is calculated. Thereafter, process goes END.

Next, discussion will be given for the method and operation for compensation of fuel transfer delay during active state of the EGR control, with reference to FIGS. 6 and 7.

Figure 6:
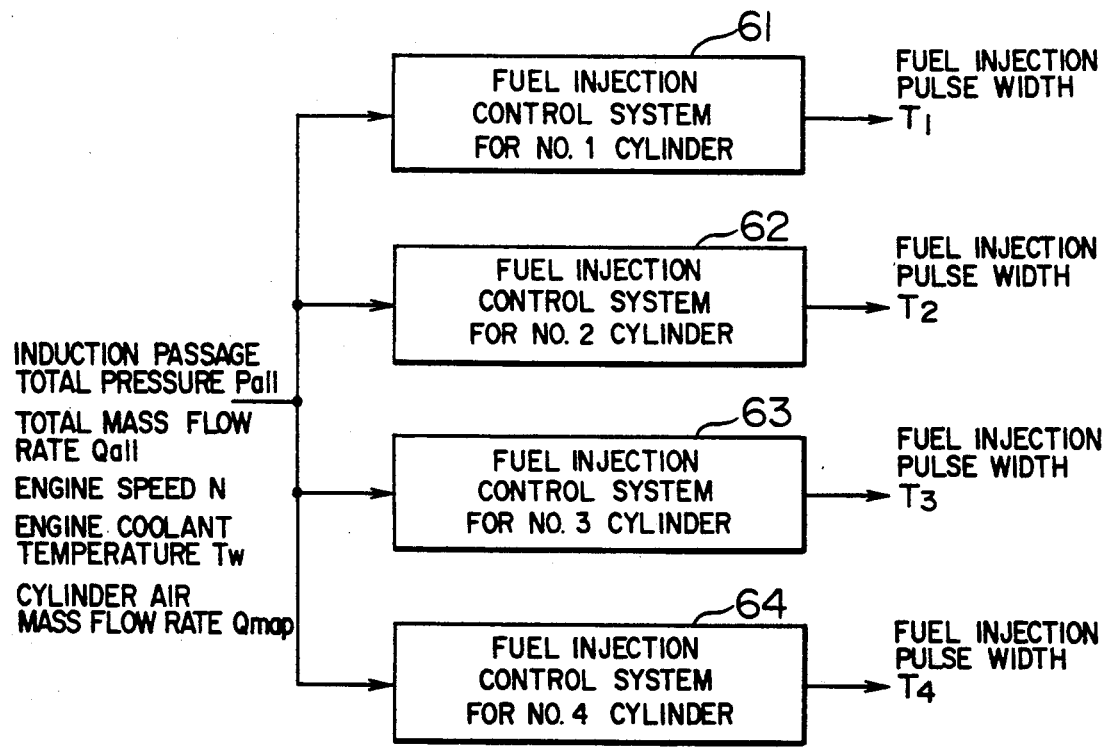
FIG. 6 is a diagrammatic illustration showing general construction of a fuel injection system, to which a control method according to the present invention is applied.

FIG. 6 shows the overall construction of a fuel injection control system when fuel transfer delay is compensated with respect to a 4-cylinder internal combustion engine with a multi-point fuel injection system. Fuel injection pulses $T_1$ to $T_4$ are calculated in mutually independent manner on the basis of the total pressure $P_{all}$ in the intake manifold, the total mass flow rate $Q_{all}$, the cylinder air mass flow rate $Q_{map}$, the engine speed N and the engine coolant temperature Tw.

Figure 7:
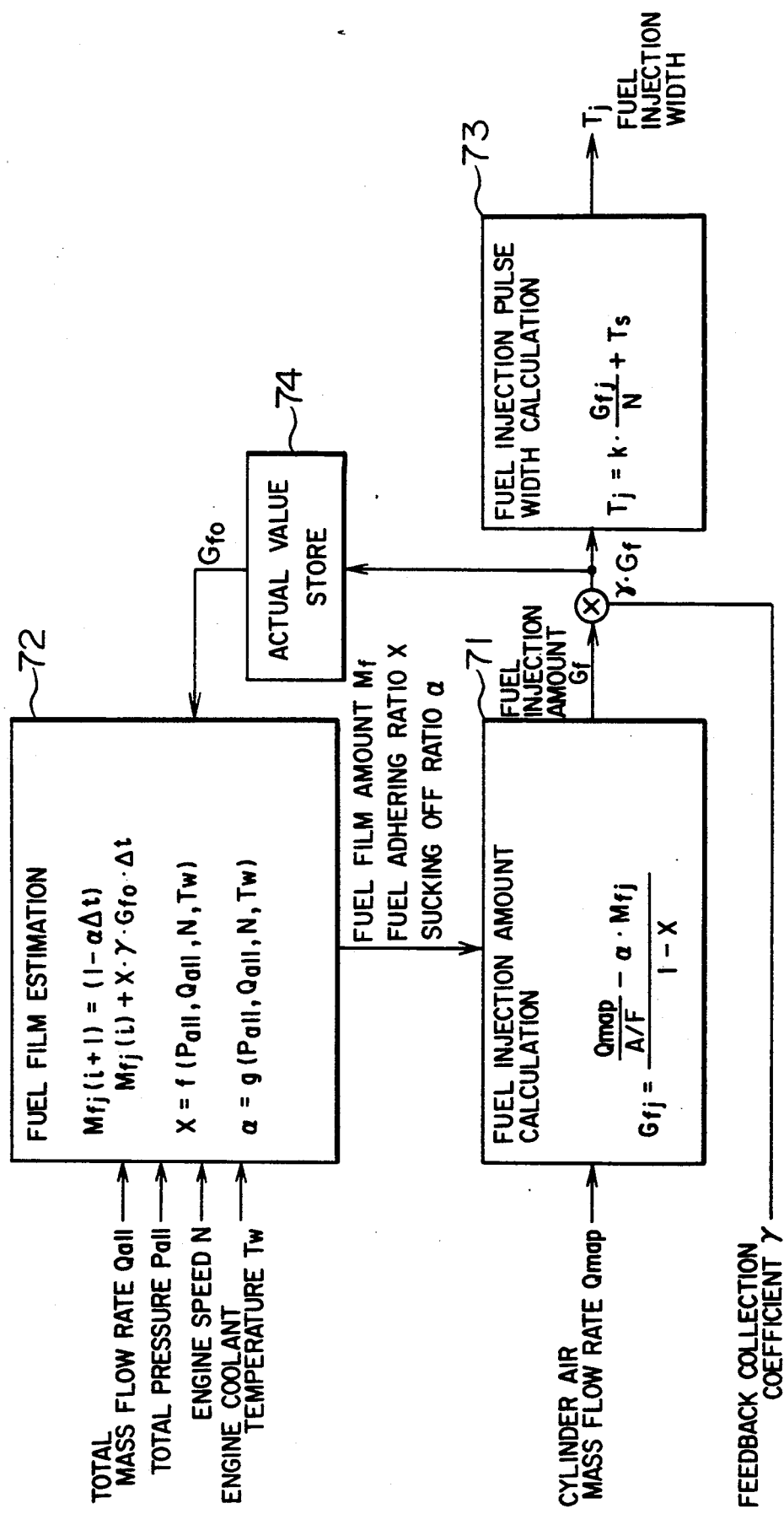
FIG. 7 is a block diagram of a fuel injection control system at one cylinder.

FIG. 7 shows construction of the fuel injection control system for the jth (j=1 to 4) cylinder. Suffix letter "j" of the variables indicates the cylinder number. In a block 71, a fuel injection amount $G_{fj}$ is calculated by the following equation:

$$G_{fj} = \frac{\frac{Q_{map}}{A/F} - \alpha M_{fj}}{1 - X} \quad (29)$$

where A/F: target air/fuel ratio

It should be noted that, in the foregoing calculation, the most recent intake manifold wetting fuel amount $M_{fj}$, a fuel adhering rate X and sucking off ratio α of fuel film into the cylinder to be derived at a block 72 are used. Manner of derivation of $M_{fj}$, X and α will be discussed later.

In a block 73, the fuel injection pulse width $T_j$ is derived by the following equation:

$$T_j = K \frac{G_{fj}}{N} + T_s \quad (30)$$

where
 $G_{fj}$: fuel injection amount;
 N: engine speed;
 $T_s$: non-effective injection period;
 k: various correction coefficients;
 γ: feedback correction coefficient.

The various correction coefficients are known per se in the field of fuel injection control technologies, and may include a cold engine enrichment correction coefficient, an acceleration enrichment correction coefficient, a correction coefficient derived through learning process and so forth. On the other hand, the feedback correction coefficient γ is a correction coefficient for air/fuel ratio control.

In a block 74, the actual fuel injection amount $G_{fj0}$ is stpred. In the block 72, the intake manifold fuel film amount $M_{fj}$ is updated through the following equation within a period starting immediately after timing of fuel injection over only a time period of a half cycle of one engine revolution, in a given period.

$$M_{fj}(i+1) = (1 - \alpha \cdot \Delta t) \cdot M_{fj}(i) + X \cdot \Delta t \cdot \gamma \cdot G_{fj0}(i) \quad (31)$$

where
 $G_{fj0}$: actual fuel injection amount;
 X: fuel adhering ratio;
 α: sucking off ratio;

Δt: fuel film amount updating period;
i: time (1 time corresponds period Δt)

The above-mentioned period of half engine revolution cycles is for 4-cylinder engine, and should become period corresponding to 2/n engine revolution for the engine having n cylinders.

In the foregoing equation, the fuel adhering ratio X and the sucking off ratio α are calculated from time-to-time using the following equations:

$$X = F(P_{all}, Q_{all}, N, Tw) \quad (32)$$

$$\alpha = G(P_{all}, Q_{all}, N, Tw) \quad (33)$$

where
F and G: given functions;
$P_{all}$: total pressure in the intake manifold;
$Q_{all}$: total mass flow rate flowing into the engine cylinder;
N: engine speed;
Tw: engine coolant temperature.

Here, the with taking the total pressure $P_{all}$ in the intake manifold, the total mass flow rate $Q_{all}$ flowing into the engine cylinder, which corresponds to mobility of gas in the vicinity of an intake valve, and so forth as parameters significantly influencing the fuel transfer characteristics, the parameters X and α are calculated based thereon. The characteristics of fuel adhering ratio X and the sucking off ratio α are preliminarily fixed through the following process.

With maintaining engine operating parameters, such as the intake air mass flow rate $Q_a$, the total pressure $P_{all}$ in the intake manifold, the total mass flow rate $Q_{all}$ flowing into the engine cylinder, the engine speed N, the engine coolant temperature Tw, the cylinder recirculated exhaust gas mass flow rate $Q_{EGR}$ and so forth, which are regarded to affect for the fuel transfer characteristics, constant, and maintaining the engine at the steady state, measurement of response of air/fuel ratio in step variation of the fuel injection amount is preliminarily performed through experiments. Then, based on the process illustrated in FIG. 14, the response of air/fuel ratio at the same engine operating condition is calculated. The fuel adhering ratio X and the sucking off ratio α are determined at a values where the measured air/fuel ratio A/Fe and the calculated air/fuel ratio A/Fs becomes closest to consistent. Judgement for the closest to the consistent is performed by checking whether the following evaluation function becomes minimum or not.

$$J = \sum_i [A/Fs(i) - A/Fe(i)]^2 \quad (34)$$

where i: time

By determining the fuel adhering ratio X and the sucking off ratio α at various engine operation ranges, the parameter characteristics in the fuel transfer characteristics can be fixed with using the fuel adhering ratio X and the sucking off ratio α as functions of parameters representative of the engine operating condition. Although the shown process fixes the fuel adhering ratio X and the sucking off ratio α as functions of the total pressure $P_{all}$ in the intake manifold, the total mass flow rate $Q_{all}$ flowing into the engine cylinder, the engine speed N, the engine coolant temperature Tw, it is possible to include the partial pressure $P_{EGR}$ of the EGR gas in the intake manifold, the partial pressure ratio $K_p$ and the cylinder recirculated exhaust gas mass flow rate $Q_{EGR}$ when the influence of these parameters is substantial. Furthermore, it is, of course, possible to take the partial pressure $P_m$ of the intake air and the partial pressure $P_{EGR}$ of the EGR gas in place of the total pressure $P_{all}$, and the cylinder air mass flow rate $Q_{map}$ and the cylinder recirculated exhaust gas mass flow rate $Q_{EGR}$ in place of the total mass flow rate $Q_{all}$, as dominant factors.

Next, practical process of FIG. 14 will be discussed. In a block 141, the response of air/fuel ratio with respect to step variation of the fuel injection amount is calculated based on the following two equations and an equation which is established by setting γ=1.0 in the foregoing equation (31).

$$G_{fc} = (1 - X) \cdot G_f + \alpha \cdot M_f \quad (35)$$

$$A/F = \frac{Q_a}{G_{fc}} \quad (36)$$

where
$G_f$: fuel injection amount;
$G_{fc}$: fuel mass flow rate flowing into cylinder;
X: fuel adhering ratio;
α: sucking off ratio;
A/F: air/fuel ratio;
$Q_a$: intake air mass flow rate.

Here, updating process for the intake manifold fuel film amount $M_f$ is performed only for period of the initial half engine revolution in each cycle immediately after variation of the fuel injection amount. In FIG. 16, an example of calculation of the response of the air/fuel ratio through the foregoing process is illustrated by solid line. As can be seen, immediately after starting variation of air/fuel ratio, the air/fuel ratio varies over a period corresponding to the initial ¼ cycle of the each cycle (half engine revolution). This is caused by updating process of the intake manifold wetting fuel film amount $M_f$.

The response of the air/fuel ratio derived through the process set forth above does not take the response characteristics of the sensor (A/F sensor). Therefore, it cannot be considered to precisely reflect actual response of the air/fuel ratio. In order to derive the fuel adhering ratio X and the sucking off ratio α, it is necessary to calculate the response of the air/fuel ratio with taking the response delay characteristics of the A/F sensor into account. A block 142 performs a process foe this purpose. Relationship between the actual air/fuel ratio and the measured air/fuel ratio by the A/F sensor is expressed by the following moving average model.

$$A/F_s(i) = \sum_{j=0}^{\infty} G(j) A/F(i-j) \quad (37)$$

$$G(j) = \frac{A/F_0(j+1) - A/F_0(j)}{A/F_0(\infty) - A/F_0(0)} \quad (38)$$

For the calculated air/fuel ratio A/F of the block 141, process of the equation (37) is provided to calculate the response A/F$_s$ of air/fuel ratio with taking the response characteristics of the oxygen sensor into account. An example of calculation of A/F$_s$ is illustrated by broken line in FIG. 16. It should be noted that A/F$_0$ in the foregoing equation (38) is the value obtained from response of output air/fuel ratio of the sensor relative to the step variation of the actual air/fuel ratio. An example of this response is illustrated in FIG. 15. A time 0 represents a timing at which response of air/fuel ratio is initiated. At a time i, the value of air/fuel ratio becomes $A/F_0(i)$. The unit time in this figure is made consistent with the updating cycle period of the intake manifolding fuel film amount in the block 141. FIG. 20 shows time chart of the response curve of the measured air/fuel ratio A/Fe and the calculated air/fuel ratio A/Fs in a case that the value J in equation (34) becomes the minimum at a certain engine condition.

Next, with reference to FIG. 8, discussion will be made for a program for implementing the above-mentioned fuel injection control method. The shown program is stored in the ROM 2 in FIG. 1 and executed periodically.

At first, at a step 801, the fuel adhering ratio X and the adhering fuel sucking off ratio α are calculated. Then, at a step 802, discrimination of the engine cylinder situated for forthcoming fuel injection relative to the engine revolution cycle position, is performed. At a step 803, using the foregoing equation (29), the fuel injection amount for the engine cylinder identified through the process of the step 802. Thereafter, at a step 804, the fuel injection pulse width is calculated using the equation (30) on the basis of the calculated fuel injection amount.

At a step 805, discrimination is made for the engine cylinder for which fuel injection has been effect most recently. Then, at a step 806, for the engine cylinder identified through the process of the step 805, the intake manifold fuel film amount is updated using the equation (31). Thereafter, the process of the program of FIG. 8 goes END.

It should be noted that the foregoing discussion for the method of calculation of the cylinder air mass flow rate and the method for controlling fuel injection is adapted to "Mass-Flow type control system" in which the intake air mass flow rate is directly detected by means of an air flow rate is directly detected by means of an air flow meter.

In case the present invention is applied to the engine employing Speed Density type fuel injection control system, in which the intake air mass flow rate is detected indirectly on the basis of the intake air pressure in the intake manifold and the engine speed, method for calculating the cylinder air mass flow rate is to be differentiated. Therefore, discussion will be given herebelow with respect to the method of calculation of the cylinder air mass flow rate when the present invention is applied for such type of the fuel injection control system, with reference to FIGS. 9 to 13.

Figure 9:
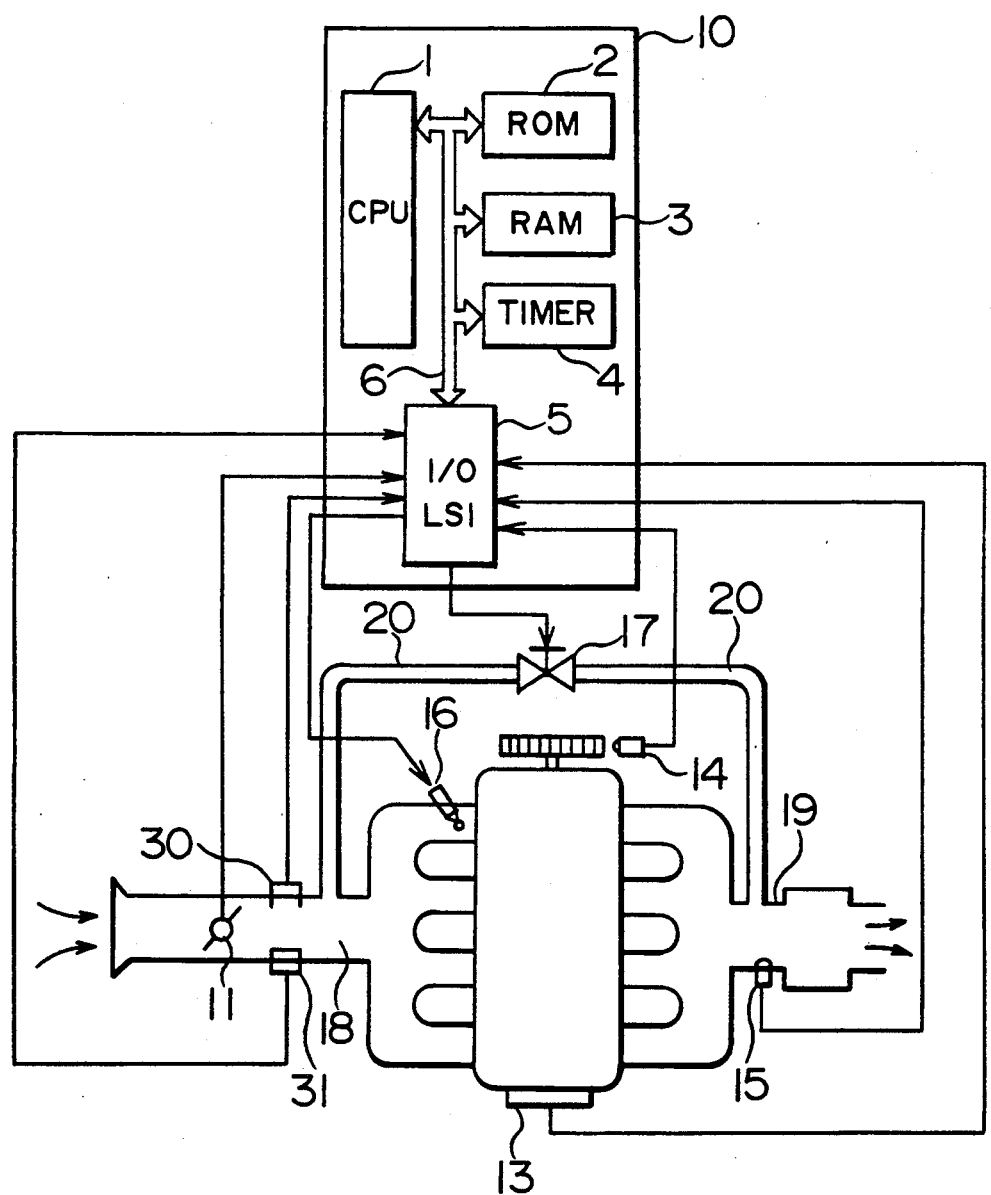
FIG. 9 is a block diagram showing the overall construction of the electronic engine control system of a type employing a intake air pressure sensor, to which the control method according to the present invention is applied.

FIG. 9 shows the overall construction of the internal combustion engine employing the Speed Density type engine control system. Construction of the control unit 10 is identical to that of the Mass-Flow type engine control system. In the shown system, instead of providing the intake air flow sensor, a pressure sensor 30 for detecting the pressure in the intake manifold, and an intake air temperature sensor 31 are provided. The outputs of these sensors are supplied to the RAM 3 via the I/O LSI 5.

Next, discussion will be given for the method of calculating the cylinder air mass flow rate in the speed Density type engine control system with reference to FIGS. 10 and 11.

Figure 10:
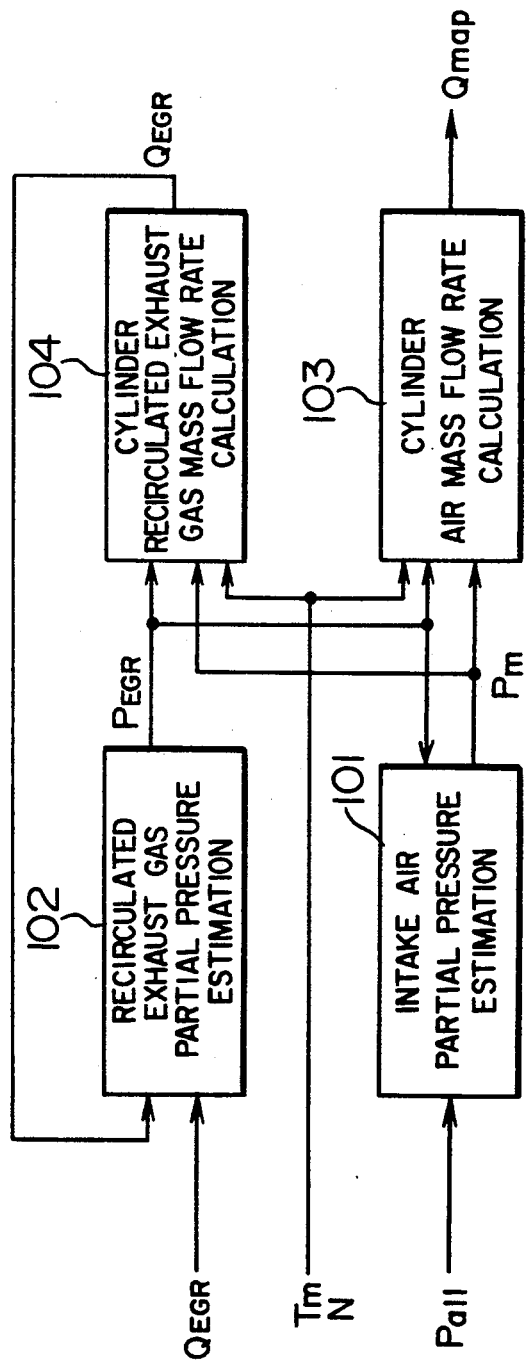
FIG. 10 is a block diagram showing method of the present invention for deriving a cylinder air mass flow rate in the control system of FIG. 9.
Figure 11:
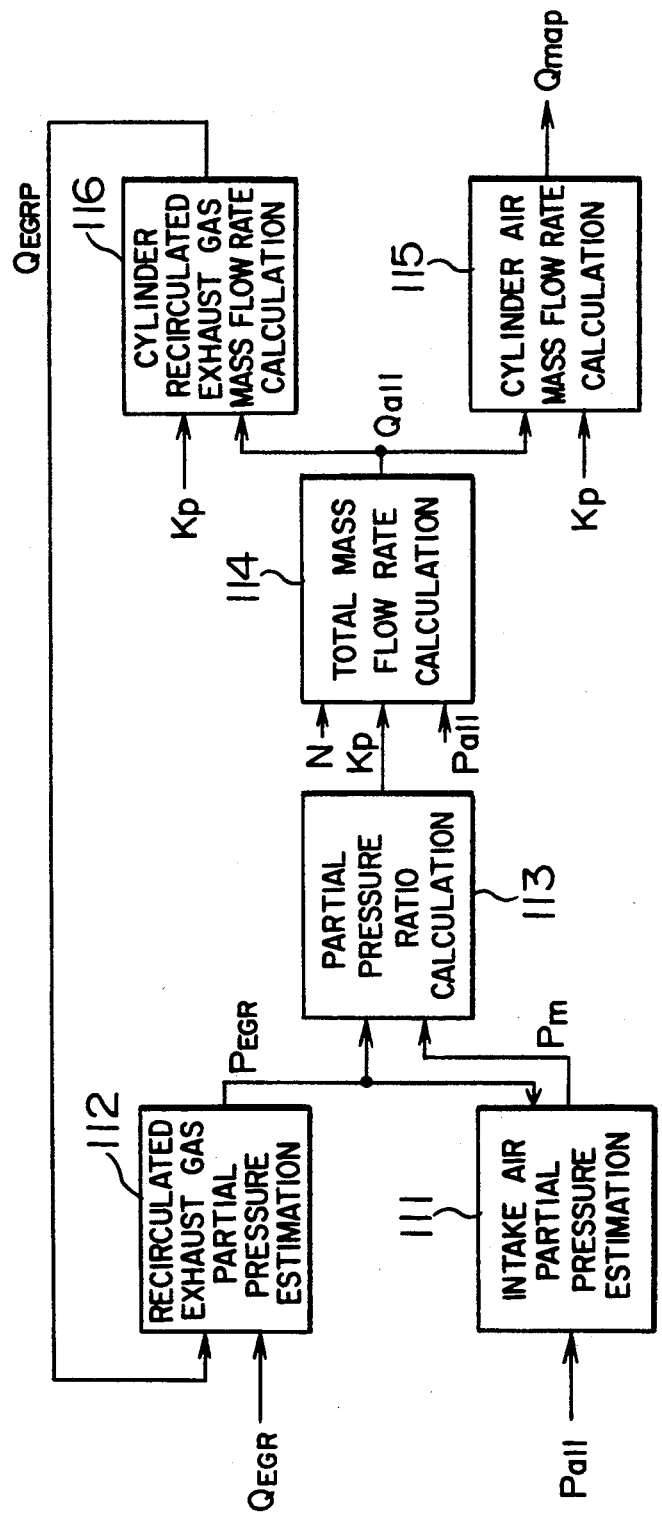
FIG. 11 is a block diagram showing another method of the present invention for deriving the cylinder air mass flow rate in the control system of FIG. 9.

FIG. 10 shows a block diagram of the first method. The shown system includes a process for predicting the partial pressure of the intake air in the intake manifold, a process for predicting the partial pressure of the exhaust gas, a process for calculating the cylinder air mass flow rate, a precess for calculating the cylinder recirculated exhaust gas mass flow rate. Practical processes will be discussed herebelow.

In a block 101, based on the predicted partial pressure $P_{EGR}$ of the exhaust gas and the total pressure $P_{all}$ in the intake manifold detected by the pressure sensor 30, the partial pressure $P_m$ of the intake air is calculated through the following equation:

$$P_m = P_{all} - P_{EGR} \tag{39}$$

In a block 102, the partial pressure $P_{EGR}$ of the exhaust gas is estimated by the equation (3) and updated.

In a step 103, based on the estimated partial pressure $P_m$ of the intake air and the partial pressure $P_{EGR}$ of the EGR gas, the engine speed N and the intake air temperature $T_m$, the cylinder air mass flow rate $Q_{map}$ is calculated using one of the following equations.

$$Q_{map} = \frac{T_{mo}}{T_m} f(P_m, P_{EGR}, N) \tag{40}$$

$$Q_{map} = \frac{T_{mo}}{T_m} f_1(P_m, N) f_2\left(\frac{P_{EGR}}{P_m}\right) \tag{41}$$

$$Q_{map} = \frac{T_{mo}}{T_m} f_3(P_m, N) f_4(P_{EGR}) \tag{42}$$

$$Q_{map} = \frac{T_{mo}}{T_m} f_5(P_m, P_{EGR}) f_6(N) \tag{43}$$

where
  $R_{mo}$: intake air temperature upon measurement of data for function.
  $f_1, f_i (i=1\sim 5)$: aforementioned function.

In a block 104, based on the partial pressure $P_m$ of the intake air, the partial pressure $P_{EGR}$ of the exhaust gas, the engine speed N and the intake air temperature $T_m$, the cylinder recirculated exhaust gas mass flow rate $Q_{EGRP}$ is calculated using one of the following equations.

$$Q_{EGRP} = \frac{T_{mo}}{T_m} g(P_{EGR}, P_m, N) \tag{44}$$

$$Q_{EGRP} = \frac{T_{mo}}{T_m} g_1(P_{EGR}, N) g_2\left(\frac{P_{EGR}}{P_m}\right) \tag{45}$$

$$Q_{EGRP} = \frac{T_{mo}}{T_m} g_3(P_{EGR}, N) g_4(P_m) \tag{46}$$

$$Q_{EGRP} = \frac{T_{mo}}{T_m} g_5(P_{EGR}, P_m) g_6(N) \tag{47}$$

where
  $T_{mo}$: intake air temperature upon measurement of data for function;
  $g_1, g_i(i=1\sim 5)$: aforementioned function.

Through the process set forth above, the cylinder air mass flow rate can be calculated by the first method.

Next, the second method for calculating the cylinder air mass flow rate will be discussed with reference to FIG. 11. This method is constituted of six processes. Since the processes in blocks 111 and 112 are the same as those in the blocks 101 and 102. Therefore, discussed for these blocks are neglected.

In a block 113, the partial pressure ratio of respective of the partial pressure is calculated by the equation (22).

In a block 114, the total mass flow rate $Q_{all}$ flowing into the engine cylinder is calculated using one of the following equations:

$$Q_{all} = \frac{T_{mo}}{T_m} h(P_{all}, K_p, N) \quad (48)$$

$$Q_{all} = \frac{T_{mo}}{T_m} h_1(P_{all}, N) h_2(K_p) \quad (49)$$

$$Q_{all} = \frac{T_{mo}}{T_m} h_3(P_{all}, K_p) h_4(N) \quad (50)$$

$$Q_{all} = \frac{T_{mo}}{T_m} \frac{P_m M_{air} + P_{EGR} M_{EGR}}{P_{all}} h_5(P_{all}, N) \quad (51)$$

where
$T_{mo}$: intake air temperature upon measurement of data for function;
$h_1, h_i$ ($i = 1 \sim 5$): aforementioned function.

In a block 115, based on the foregoing equation (27), the cylinder air mass flow rate is calculated. In a block 116, with the equation (28), the cylinder recirculated exhaust gas mass flow rate is calculated.

Through the process as set forth above, the cylinder air mass flow rate can be calculated by the second method.

Next, the operation of the programs corresponding to the methods of FIGS. 10 and 11 will be discussed with reference to FIGS. 12 and 13.

Figure 12:
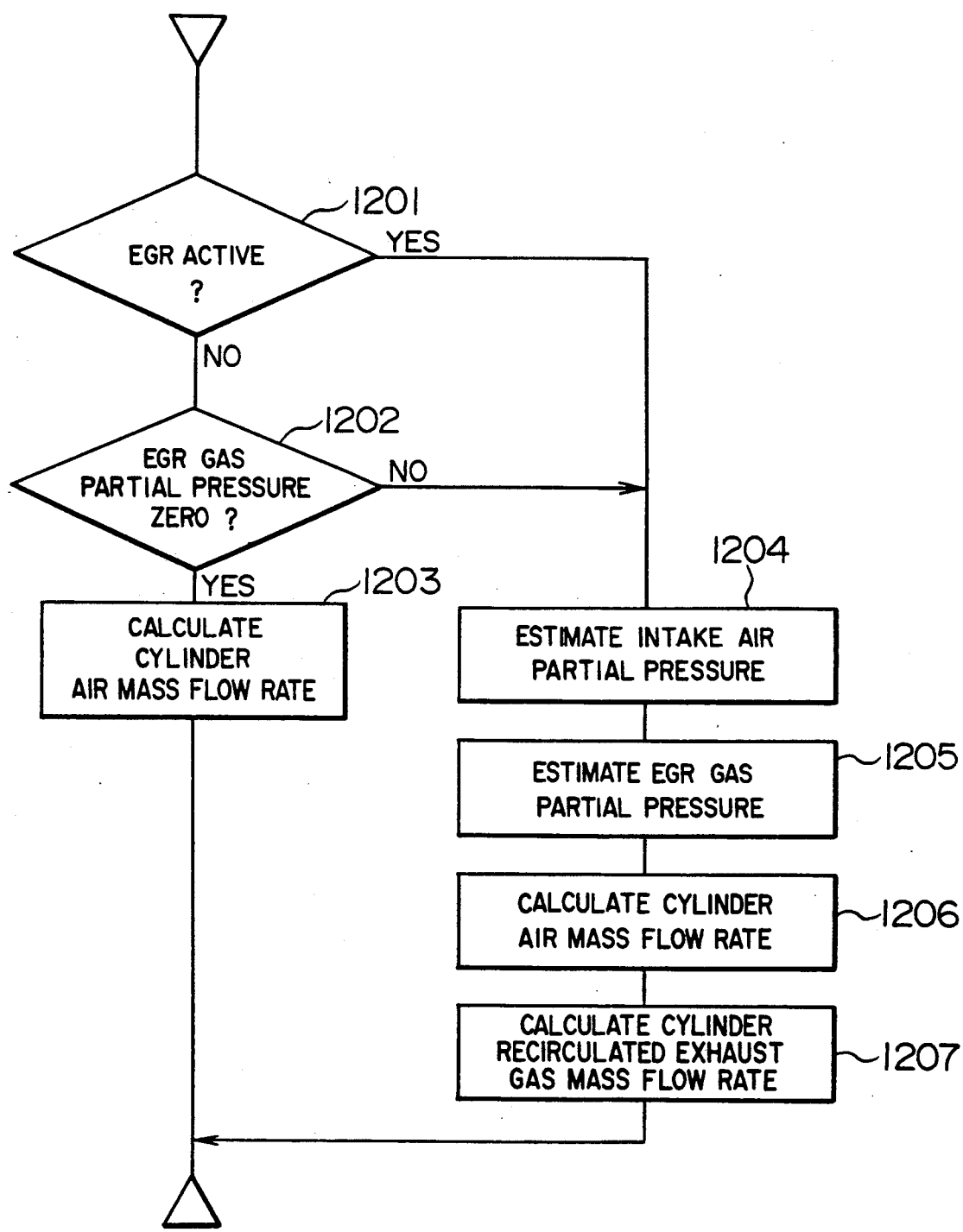
FIG. 12 is a flowchart showing a method of FIG. 10 for deriving the cylinder air mass flow rate.
Figure 13:
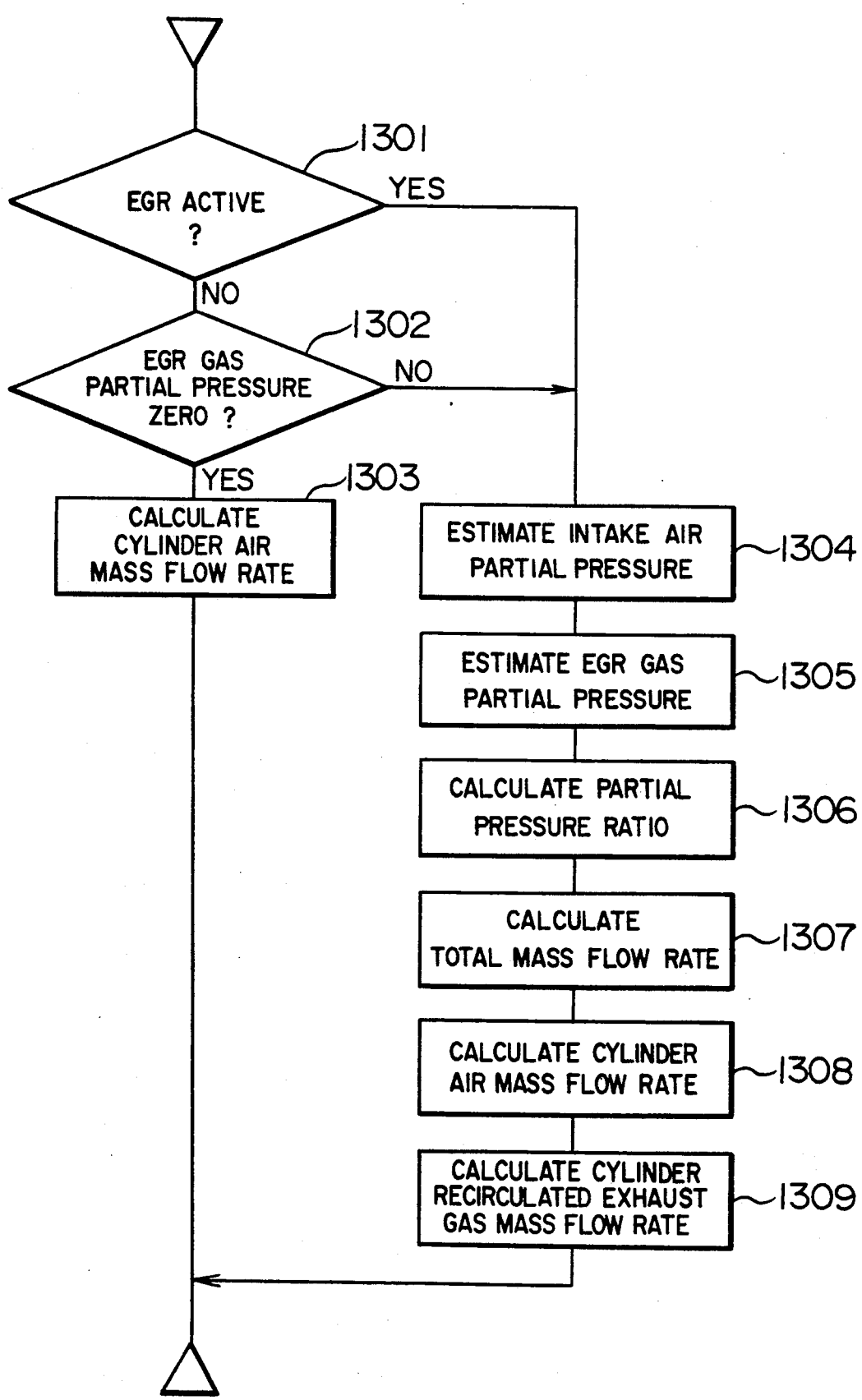
FIG. 13 is a flowchart showing a method of FIG. 11 for deriving the cylinder air mass flow rate.

FIG. 12 shows a program corresponding to the first method as set forth above with reference to FIG. 10. This program is stored in the ROM 2 of FIG. 9 and is adapted to be periodically executed with a given interval. Initially, at a step 1201, by checking a predetermined flag, state of the EGR control is discriminated whether it is in the active state (in which the EGR valve is open) or not. When the EGR control is active, process is advanced to the sequence of process starting at a step 1204, and otherwise the process is advanced to a step 1202.

At the step 1202, check is performed whether the partial pressure $P_{EGR}$ of the exhaust gas, which is calculated at the later step is 0 or not. If the partial pressure $P_{EGR}$ is 0, the process is advanced to a step 1203, and otherwise judgement is made that the exhaust gas is remained in the intake manifold to advance the process to the step 1204 for performing the process similar to that to be performed while the EGR control is active.

In the step 1203, the cylinder air mass flow rate is calculated by the following equation and then the process goes END.

$$Q_{map} = \frac{T_{mo}}{T_m} h_6(P_m, N) \quad (52)$$

where
$h_6$: given function
$T_{mo}$: intake air temperature upon measurement of data for function.

The above-mentioned function corresponds to the two dimensional table and the function value can be obtained through table look-up. The table data can be obtained by measuring the intake air mass flow rate $Q_a$ ($= Q_{map}$) at the steady states of the intake air pressure in the intake manifold and the engine speed while the engine is driven at steady state with maintaining the EGR control inactive state.

At a step 1204, the partial pressure $P_m$ of the intake air is calculated using the equation (39). At a step 1205, the partial pressure $P_{EGR}$ of the EGR gas in the intake manifold is estimated using the equation (3). At a step 1206, the cylinder air mass flow rate $Q_{map}$ is calculated using one of the equations (40) to (43). At a step 1207, the cylinder recirculated exhaust gas mass flow rate $Q_{EGR}$ is calculated using one of the equations (44) to (47).

Next, with reference to FIG. 13, the operation of the program of the second method will be discussed. The process up to the step 1305 is the same as the process of the steps up to the step 1205 of FIG. 12. Therefore, the discussion for these processes are neglected. At a step 1306, the partial pressure ratio is calculated with the equation (22). At a step 1307, the total mass flow rate $Q_{all}$ flowing into the engine cylinder is calculated through one of the equations (48) to (51). Then, at a step 1308, the cylinder air mass flow rate $Q_{map}$ is calculated by the equation (27). Finally, at a step 1309, the cylinder recirculated exhaust gas mass flow rate $Q_{EGRP}$ is calculated using the equation (28). Then, the process goes END.

Figure 8:
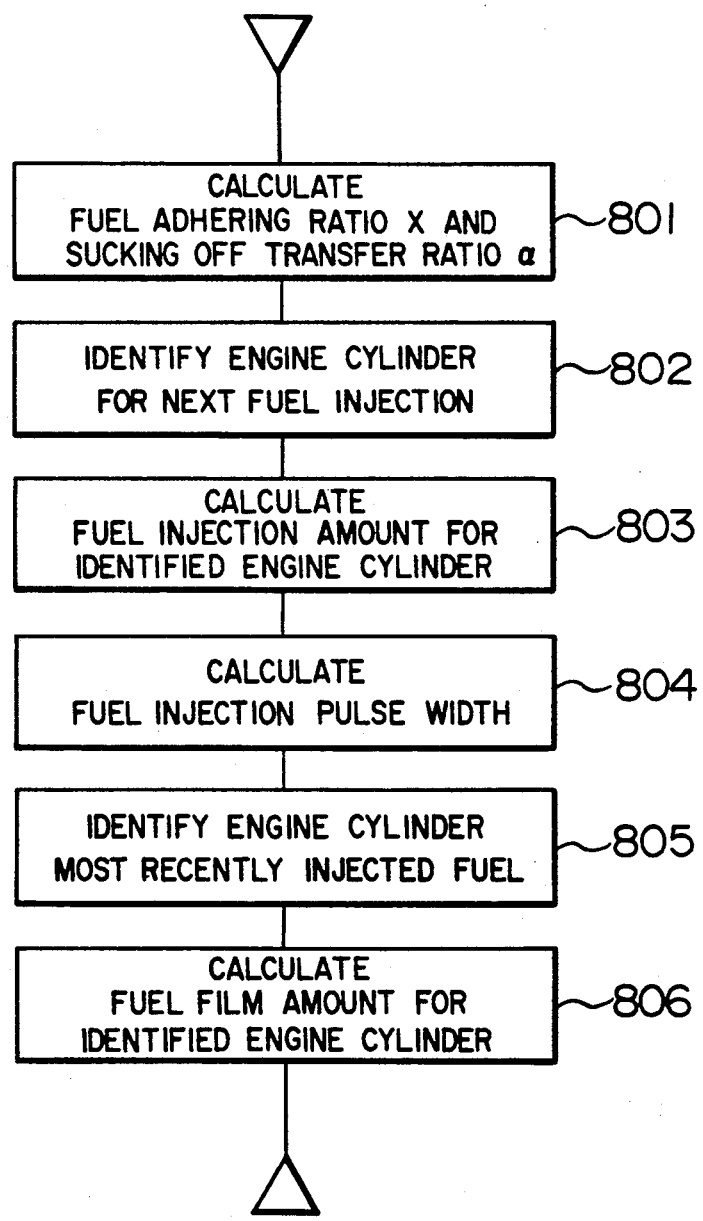
FIG. 8 is a flowchart of a program for calculating a fuel injection pulse width.

For the fuel control, the program of FIG. 8 can also be applied for the D-jetronics system.

The methods set forth above are designed for calculating the cylinder air mass flow rate in the systems employing one of the intake air flow sensor or the pressure sensor. When the system includes both of the intake air flow sensor and the pressure sensor, the cylinder air mass flow rate may be derived through the following process. This process is illustrated in FIGS. 17 and 18. In these methods, the total pressure measured value $P_{all}$ in the intake manifold and the measured intake air mass flow rate $Q_a$ are taken as primary input information.

FIG. 17 shows the block diagram of the first method. This method is similar to the method of FIG. 2. The processes in blocks 21, 22, 24 and 25 are the same as those in the corresponding blocks in FIG. 2. In a block 171, the partial pressure $P_{EGR}$ is derived by subtracting the partial pressure $P_m$ of the intake air from the total pressure $P_{all}$ in the intake manifold.

The second method will be discussed with reference to FIG. 18. This method is similar to that illustrated in FIG. 3. The processes in blocks 21, 22, 35, 36 and 37 are the same as the corresponding blocks in FIG. 3. In a block 341, the partial pressure ratio is calculated. The process in the step 171 is the same as that in the corresponding block in FIG. 17.

The flowchart of the foregoing first method becomes the same to FIG. 4. The content of processes becomes same to that of FIG. 4 except for a step 407. At a step 407, the partial pressure $P_{EGR}$ of the exhaust gas is derived by subtracting the partial pressure $P_m$ of the intake air from the total pressure $P_{all}$. On the other hand, the flowchart of the program of the second method is substantially the same as that of FIG. 5. The process of the second method is differentiated from that of FIG. 5 at a step 508. In the process of the step 508, only the partial pressure ratio is calculated. The content of processes are equal to that discussed above except for that in a step 507. At a step 507, the partial pressure $P_{EGR}$ of the exhaust gas is derived by subtracting the partial pressure $P_m$ of the intake air from the total pressure $P_{all}$.

As can be appreciated herefrom, according to the present invention, the cylinder air mass flow rate is calculated and performs compensation of the fuel transfer delay with taking various conditions associated with the exhaust gas in the intake manifold, is performed calculation of the cylinder air mass flow rate with high precision and precise compensation of the fuel transfer delay can be done even under the condition where the EGR control is active.

What is claimed is:

1. In an electronic engine control system for an internal combustion engine, in which a cylinder air mass flow rate to be actually introduced into an engine cylinder is calculated using measured value of a parameter associated with engine operating condition, and a fuel injection amount is controlled corresponding to the calculated cylinder air mass flow rate, a method for calculating the cylinder air mass flow rate comprising the steps of:

deriving a mass flow rate of a recirculated exhaust gas flowing into an induction passage of the engine, said engine having an exhaust gas recirculation system;

estimating a partial pressure of the exhaust gas within said induction passage on the basis of said mass flow rate of the recirculated exhaust gas; and deriving said cylinder air mass flow rate on the basis of the estimated value of the partial pressure of the recirculated exhaust gas.

2. In an electronic engine control system for an internal combustion engine, in which a cylinder air mass flow rate to be actually introduced into an engine cylinder is calculated using measured value of a parameter associated with engine operating condition, and a fuel injection amount is controlled corresponding to the calculated cylinder air mass flow rate, a method for calculating the cylinder air mass flow rate comprising the steps of:

deriving a mass flow rate of a recirculated exhaust gas flowing into an induction passage of the engine, said engine having an exhaust gas recirculation system;

estimating an amount of the recirculated exhaust gas mass flow rate introduced into the engine cylinder on the basis of said mass flow rate of the recirculated exhaust gas; and deriving said cylinder air mass flow rate on the basis of the estimated value of the recirculated exhaust gas mass flow rate introduced into the engine cylinder.

3. In an electronic engine control system for an internal combustion engine, in which a cylinder air mass flow rate to be actually introduced into an engine cylinder is calculated using measured value of a parameter associated with engine operating condition, and a fuel injection amount is controlled corresponding to the calculated cylinder air mass flow rate, a method for calculating the cylinder air mass flow rate comprising the steps of:

deriving a mass flow rate of a recirculated exhaust gas flowing into an induction passage of the engine, said engine having an exhaust gas recirculation system;

estimating a partial pressure ratio of an intake air and said recirculated exhaust gas in said induction passage on the basis of an intake air mass flow rate and the recirculated exhaust gas mass flow rate flowing into said induction passage; and deriving the cylinder air mass flow rate on the basis of predetermined parameters including said partial pressure ratio.

4. In an electronic engine control system for an internal combustion engine employing an exhaust gas recirculation system, in which a fuel injection amount is controlled corresponding to measured value of a parameter associated with engine operating condition, a method for calculating the cylinder air mass flow rate comprising the steps of:

deriving mass flow rates of an intake air and a recirculated exhaust gas introduced into an induction passage;

estimating a partial pressure of the intake air in the induction passage on the basis of the intake air mass flow rate flowing into the induction passage of the engine;

estimating a partial pressure of the recirculated exhaust gas in the induction passage on the basis of said mass flow rate of recirculated exhaust gas flowing into the induction passage of the engine; and deriving the cylinder air mass flow rate on the basis of the estimated value of the partial pressure of the intake air and the estimated value of the partial pressure of the recirculated exhaust gas.

5. In an electronic engine control system for an internal combustion engine employing an exhaust gas recirculation system, in which a fuel injection amount is controlled corresponding to measured value of a parameter associated with engine operating condition, a method for calculating the cylinder air mass flow rate comprising the steps of:

deriving mass flow rates of an intake air and a recirculated exhaust gas introduced into an induction passage;

estimating a partial pressure of the intake air in the induction passage on the basis of the intake air mass flow rate flowing into the induction passage of the engine;

estimating a partial pressure of the recirculated exhaust gas in the induction passage on the basis of said recirculated exhaust gas mass flow rate;

estimating a total pressure of a gas in the induction passage and a partial pressure ratio of the intake air and the exhaust gas on the basis of the estimated value of the partial pressure of the intake air and the estimated value of the partial pressure of the exhaust gas; and deriving the cylinder air mass flow rate on the basis of said total pressure and said partial pressure ratio.

6. In an electronic engine control system for an internal combustion engine employing an exhaust gas recirculation system, in which a fuel injection amount is controlled corresponding to measured value of a parameter associated with engine operating condition, a method for calculating the cylinder air mass flow rate comprising the steps of:

deriving mass flow rate of a recirculated exhaust gas introduced into an induction passage;

estimating a partial pressure of the recirculated exhaust gas in the induction passage on the basis of said recirculated exhaust gas mass flow rate;

estimating a partial pressure of an intake air on the basis of a measured value of the internal pressure in said induction passage and said partial pressure of the recirculated exhaust gas; and deriving the cylinder air mass flow rate on the basis of the estimated value of the partial pressure of the intake air and the estimated value of the partial pressure of the recirculated exhaust gas.

7. In an electronic engine control system for an internal combustion engine employing an exhaust gas recirculation system, in which a fuel injection amount is controlled corresponding to measured value of a parameter associated with engine operating condition, a method for calculating the cylinder air mass flow rate comprising the steps of:

deriving mass flow rate of a recirculated exhaust gas introduced into an induction passage;

estimating a partial pressure of the recirculated exhaust gas in the induction passage on the basis of said recirculated exhaust gas mass flow rate;

estimating a partial pressure of an intake air the basis of a measured value of the internal pressure in said induction passage and said partial pressure of the recirculated exhaust gas;

estimating a pressure ratio of the intake air and the recirculated exhaust gas on the basis of the estimated partial pressure of the intake air and the recirculated exhaust gas; and deriving the cylinder air mass flow rate on the basis of the pressure in said induction passage and the partial pressure ratio.

8. In an electronic engine control system for an internal combustion engine, in which a parameter representative of a fuel transfer characteristics is derived using measured values of parameters of the engine, and a fuel injection amount is controlled depending upon the parameter representative of the fuel transfer characteristics, a method for controlling a fuel injection amount comprising the steps of:

deriving mass flow rates of an intake air and a recirculated exhaust gas introduced into the induction passage;

estimating a total pressure in the induction passage on the basis of the intake air mass flow rate and the recirculated exhaust gas mass flow rate flowing in said induction passage; and deriving a parameter representative of a fuel transfer characteristics in said induction passage on the basis of predetermined parameters including said total pressure.

9. In an electronic engine control system for an internal combustion engine, in which a parameter representative of a fuel transfer characteristics is derived using measured values of parameters of the engine, and a fuel injection amount is controlled depending upon the parameter representative of the fuel transfer characteristics, a method for controlling a fuel injection amount comprising the steps of:

deriving mass flow rates of an intake air and a recirculated exhaust gas introduced into the induction passage of the engine having an exhaust gas recirculation system;

estimating a total mass flow rate of a gas flowing into the cylinder on the basis of the intake air mass flow rate and the recirculated exhaust gas mass flow rate flowing into said induction passage; and deriving a parameter representative of a fuel transfer characteristics in said induction passage on the basis of predetermined parameters including said total mass flow rate.

10. In an electronic engine control system for an internal combustion engine, in which a parameter representative of a fuel transfer characteristics is derived using measured values of parameters of the engine, and a fuel injection amount is controlled depending upon the parameter representative of the fuel transfer characteristics, a method for controlling a fuel injection amount comprising the steps of:

deriving a mass flow rate of a recirculated exhaust gas flowing into the induction passage of the engine, said engine having an exhaust gas recirculation system;

estimating a partial pressure of the recirculated exhaust gas in said induction passage on the basis of the mass flow rate of the recirculated exhaust gas flowing into the induction passage; and deriving a parameter representative of the fuel transfer characteristics in said induction passage on the basis of predetermined parameters including said estimated partial pressure.

11. In an electronic engine control system for an internal combustion engine, in which a parameter representative of a fuel transfer characteristics is derived using measured values of parameters of the engine, and a fuel injection amount is controlled depending upon the parameter representative of the fuel transfer characteristics, a method for controlling a fuel injection amount comprising the steps of:

deriving a mass flow rate of a recirculated exhaust gas flowing into the induction passage of the engine, said engine having an exhaust gas recirculation system;

estimating an mass flow rate of the recirculated exhaust gas introduced into the engine cylinder on the basis of the mass flow rate of the recirculated exhaust gas flowing into the induction passage; and deriving a parameter representative of the fuel transfer characteristics in said induction passage on the basis of predetermined parameters including said estimated recirculated exhaust gas mass flow rate introduced into the engine cylinder.

12. In an electronic engine control system for an internal combustion engine employing an exhaust gas recirculation system, in which a fuel injection amount is controlled corresponding to measured value of a parameter associated with engine operating condition, a method for calculating a cylinder air mass flow rate comprising the steps of:

estimating a partial pressure of the intake air in the induction passage on the basis of a measured intake air mass flow rate;

estimating a partial pressure of the recirculated exhaust gas flowing into the induction passage on the basis of a detected value of the internal pressure of said induction passage and said estimated partial pressure of the intake air; and calculating said cylinder air mass flow rate on the basis of the estimated value of the partial pressure of the intake air and the estimated value of the partial pressure of the recirculated exhaust gas.

13. In an electronic engine control system for an internal combustion engine employing an exhaust gas recirculation system, in which a fuel injection amount is controlled corresponding to measured value of a parameter associated with engine operating condition, a method for calculating a cylinder air mass flow rate comprising the steps of:

detecting intake air mass flow rate and pressure in an induction passage of the engine;

estimating a partial pressure of the intake air in the induction passage on the basis of an intake air mass flow rate;

estimating a partial pressure of the recirculated exhaust gas flowing in the induction passage on the basis of a detected value of the internal pressure of said induction passage and said estimated partial pressure of the intake air; and deriving a partial pressure ratio on the basis of the estimated value of the partial pressure of the intake air and the estimated value of the partial pressure of the recirculated exhaust gas calculating said cylinder air mass flow rate on the basis of the measured internal pressure in said induction passage and said partial pressure ratio.

14. In an electronic engine control system for an internal combustion engine, in which a cylinder air mass flow rate to be actually introduced into an engine cylinder is calculated using measured value of a parameter associated with engine operating condition, and a fuel injection amount is controlled corresponding to the calculated cylinder air mass flow rate, a method for calculating a cylinder air mass flow rate comprising the steps of:

detecting intake air mass flow rate and pressure in an induction passage of the engine, said engine having an exhaust gas recirculation system;

estimating a partial pressure of a recirculated exhaust gas in the induction passage on the basis of an intake air mass flow rate and a detected value of the internal pressure in the induction passage; and deriving said cylinder air mass flow rate on the basis of predetermined parameters including said estimated partial pressure.

15. In an electronic engine control system for an internal combustion engine, in which a cylinder air mass flow rate to be actually introduced into an engine cylinder is calculated using measured value of a parameter associated with engine operating condition, and a fuel injection amount is controlled corresponding to the calculated cylinder air mass flow rate, a method for calculating a cylinder air mass flow rate comprising the steps of:

detecting intake air mass flow rate and pressure in an induction passage of the engine, said engine having an exhaust gas recirculation system;

estimating a mass flow rate of a recirculated exhaust gas into the cylinder on the basis of an intake air flow mass rate and a detected value of the internal pressure in the induction passage; and deriving said cylinder air mass flow rate on the basis of predetermined parameters including said estimated predicted recirculated exhaust gas mass flow rate.

16. In an electronic engine control system for an internal combustion engine, in which a cylinder air mass flow rate to be actually introduced into an engine cylinder is calculated using measured value of a parameter associated with engine operating condition, and a fuel injection amount is controlled corresponding to the calculated cylinder air mass flow rate, a method for calculating a cylinder air mass flow rate comprising the steps of:

detecting intake air mass flow rate and pressure in an induction passage of the engine, said engine having an exhaust gas recirculation system;

estimating a partial pressure ratio of an intake air and a recirculated exhaust gas in the induction passage on the basis of an intake air mass flow rate and a detected value of the internal pressure in the induction passage; and deriving said cylinder air mass flow rate on the basis of predetermined parameters including said estimated partial pressure ratio.

17. In an electronic engine control system for an internal combustion engine, in which a parameter representative of a fuel transfer characteristics is derived using measured values of parameters of the engine, and a fuel injection amount is controlled depending upon the parameter representative of the fuel transfer characteristics, a method for controlling a fuel injection amount comprising the steps of:

detecting an internal pressure in an induction passage;

deriving a mass flow rate of a recirculated exhaust gas into the induction passage of the engine, said engine having exhaust gas recirculation system;

deriving a total mass flow rate of a gas flowing into the engine cylinder on the basis of a detected internal pressure in the induction passage and the recirculated exhaust gas mass flow rate introduced into the induction passage; and deriving a parameter representative of said fuel transfer characteristics on the basis of predetermined parameters including the calculated total mass flow rate flowing into the engine cylinder.

18. In an electronic engine control system for an internal combustion engine, in which a parameter representative of a fuel transfer characteristics is derived using measured values of parameters associated with engine operating condition, and a fuel injection amount is controlled depending upon the parameter representative of the fuel transfer characteristics, a method for controlling a fuel injection amount comprising the steps of:

detecting intake air mass flow rate and pressure in an induction passage of the engine, said engine having an exhaust gas recirculation system;

deriving a total mass flow rate of a gas flowing into the engine cylinder on the basis of a detected internal pressure in the induction passage and an intake air mass flow rate; and deriving a parameter representative of said fuel transfer characteristics on the basis of predetermined parameters including the calculated total mass flow rate flowing into the engine cylinder.

19. In an electronic engine control system for an internal combustion engine, in which a parameter representative of a fuel transfer characteristics is derived using measured values of parameters including an internal pressure in an induction passage of the engine, and a fuel injection amount is controlled depending upon the parameter representative of the fuel transfer characteristics, a method for controlling a fuel injection amount comprising the steps of:

detecting intake air mass flow rate and pressure in an induction passage of the engine, said engine having an exhaust gas recirculation system;

estimating a partial pressure of a recirculated exhaust gas in the induction passage on the basis of a detected internal pressure in the induction passage and an intake air mass flow rate; and deriving a parameter representative of said fuel transfer characteristics on the basis of predetermined parameters including the estimated partial pressure.

20. In an electronic engine control system for an internal combustion engine, in which a parameter representative of a fuel transfer characteristics is derived using measured values of parameters associated with engine running condition engine, and a fuel injection amount is controlled depending upon the parameter representative of the fuel transfer characteristics, a method for controlling a fuel injection amount comprising the steps of:

detecting intake air mass flow and pressure in an induction passage of the engine, said engine having an exhaust gas recirculation system;

deriving a mass flow rate of a recirculated exhaust gas introduced into the engine cylinder on the basis of a detected internal pressure in the induction passage and an intake air mass flow rate; and deriving a parameter representative of said fuel transfer characteristics on the basis of predetermined parameters including the calculated recirculated exhaust gas flow rate.

* * * * *